(12) United States Patent
Larson

(10) Patent No.: US 12,449,071 B2
(45) Date of Patent: Oct. 21, 2025

(54) COMPRESSION FITTING

(71) Applicant: Mueller International, LLC, Atlanta, GA (US)

(72) Inventor: Ryan Fairchild Larson, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 18/201,544

(22) Filed: May 24, 2023

(65) Prior Publication Data

US 2023/0383876 A1    Nov. 30, 2023

Related U.S. Application Data

(60) Provisional application No. 63/345,725, filed on May 25, 2022.

(51) Int. Cl.
*F16L 21/08* (2006.01)
*F16L 21/06* (2006.01)

(52) U.S. Cl.
CPC ............. *F16L 21/08* (2013.01); *F16L 21/065* (2013.01)

(58) Field of Classification Search
CPC .......... F16L 17/04; F16L 21/06; F16L 21/065
See application file for complete search history.

(56) References Cited

U.S. PATENT DOCUMENTS

| | | |
|---|---|---|
| 1,822,056 A | 9/1931 | Noble |
| 2,201,372 A | 5/1940 | Miller |
| 2,245,154 A | 6/1941 | McWane |
| 2,490,620 A | 12/1949 | Cole et al. |
| 2,529,552 A | 11/1950 | Herold |
| 2,547,394 A | 4/1951 | Hynes et al. |
| 2,585,453 A | 2/1952 | Gallagher et al. |
| 2,672,187 A | 3/1954 | Smith |
| 2,786,697 A | 3/1957 | Rescheneder |
| 2,831,711 A | 4/1958 | Leadbetter |
| 2,999,701 A | 9/1961 | Blair et al. |

(Continued)

FOREIGN PATENT DOCUMENTS

| | | |
|---|---|---|
| CA | 2867172 | 9/2013 |
| CA | 2881822 | 12/2013 |

(Continued)

OTHER PUBLICATIONS

Larson, Ryan Fairchild; Final Office Action for U.S. Appl. No. 17/236,365, filed Apr. 21, 2021, mailed Dec. 13, 2023, 39 pgs.

(Continued)

*Primary Examiner* — Zachary T Dragicevich
*Assistant Examiner* — Fannie Kee
(74) *Attorney, Agent, or Firm* — Taylor Duma LLP

(57) ABSTRACT

A compression fitting includes a first fitting segment defining a first arcuate central section, a first retention rib extending radially inward from the first arcuate central section; a second fitting segment defining a second arcuate central section, a second retention rib ending radially inward from the second arcuate central section; and a grip ring defining a first ring end and a second ring end, wherein a split is defined between the first ring end and the second ring end, and wherein the first ring end engages the first retention rib and the second ring end engages the second retention rib.

10 Claims, 18 Drawing Sheets

(56) References Cited

U.S. PATENT DOCUMENTS

| | | | |
|---|---|---|---|
| 3,204,988 A | 9/1965 | Ouderkirk et al. | |
| 3,233,926 A | 2/1966 | Walterscheid-Muller | |
| 3,389,923 A | 6/1968 | Love, Jr. et al. | |
| 3,441,297 A | 4/1969 | Koski | |
| 3,545,794 A | 12/1970 | Wise et al. | |
| 3,815,940 A | 6/1974 | Luckenbill | |
| 3,874,709 A | 4/1975 | Macdonald | |
| 3,924,877 A | 12/1975 | Leopold, Jr. et al. | |
| 3,924,882 A | 12/1975 | Ellis | |
| 3,944,265 A * | 3/1976 | Hiemstra | F16L 21/065 29/505 |
| 4,059,297 A | 11/1977 | Grahl et al. | |
| 4,082,326 A | 4/1978 | Bryson | |
| 4,119,333 A * | 10/1978 | Straub | F16L 17/04 285/112 |
| 4,676,530 A | 6/1987 | Nordgren et al. | |
| 4,878,697 A | 11/1989 | Henry | |
| 5,160,179 A | 11/1992 | Takagi | |
| 5,351,998 A | 10/1994 | Behrens et al. | |
| 5,487,572 A | 1/1996 | Combot-Courrau et al. | |
| 5,496,076 A | 3/1996 | Lin | |
| 5,553,901 A | 9/1996 | Serot | |
| 5,692,784 A | 12/1997 | Hama et al. | |
| 5,692,785 A | 12/1997 | Wartluft et al. | |
| 5,695,224 A | 12/1997 | Grenier | |
| 5,730,476 A | 3/1998 | Gouda | |
| 6,264,250 B1 | 7/2001 | Teraoka et al. | |
| 6,642,451 B1 | 11/2003 | Gretz | |
| 6,824,172 B1 | 11/2004 | Komolrochanaporn | |
| 6,835,088 B2 | 12/2004 | Shemtov | |
| 6,913,292 B2 | 7/2005 | Snyder, Sr. et al. | |
| 7,080,859 B1 | 7/2006 | Gretz et al. | |
| 7,396,053 B2 | 7/2008 | Webb et al. | |
| 7,621,569 B2 | 11/2009 | Anthoine | |
| 8,038,180 B2 | 10/2011 | Williams et al. | |
| 8,042,234 B2 * | 10/2011 | Rigollet | F16L 21/065 24/19 |
| 8,303,001 B2 | 11/2012 | Oh | |
| 8,322,755 B2 | 12/2012 | Kluss et al. | |
| 8,398,122 B2 | 3/2013 | Crompton et al. | |
| 8,528,944 B2 | 9/2013 | Lee | |
| 8,528,945 B2 | 9/2013 | Bird et al. | |
| 8,776,351 B2 | 7/2014 | Bird et al. | |
| 8,789,832 B2 | 7/2014 | Gabert | |
| 8,894,100 B2 | 11/2014 | Eaton et al. | |
| 9,168,585 B2 * | 10/2015 | Schell | F16L 17/04 |
| 9,217,529 B2 | 12/2015 | Crompton et al. | |
| 9,366,368 B2 | 6/2016 | Hausl | |
| 9,534,714 B2 | 1/2017 | Eaton et al. | |
| 9,599,266 B2 | 3/2017 | Schreckenberg et al. | |
| 9,611,961 B2 | 4/2017 | Bennett et al. | |
| 9,689,517 B2 | 6/2017 | Petersen et al. | |
| 9,746,114 B2 | 8/2017 | Le Quere | |
| 9,791,078 B2 | 10/2017 | Lee | |
| 9,851,028 B2 | 12/2017 | Stout et al. | |
| 9,879,810 B2 | 1/2018 | Crompton et al. | |
| 9,903,516 B2 | 2/2018 | Salehi-Bakhtiari et al. | |
| 9,915,385 B2 | 3/2018 | Eaton et al. | |
| 10,578,234 B2 * | 3/2020 | Bowman | F16L 17/04 |
| 11,015,748 B2 | 5/2021 | Larson et al. | |
| 11,754,208 B2 | 9/2023 | Larson | |
| 11,774,022 B2 | 10/2023 | Larson | |
| 2001/0047572 A1 * | 12/2001 | Cassel | F16L 21/065 24/279 |
| 2003/0015872 A1 * | 1/2003 | Potts | F16L 21/065 285/368 |
| 2004/0068847 A1 * | 4/2004 | Belisle | F16L 21/065 24/279 |
| 2004/0090067 A1 | 5/2004 | Pridham | |
| 2004/0261227 A1 * | 12/2004 | Cassel | F16L 21/065 24/20 R |
| 2005/0084327 A1 | 4/2005 | Chelchowski et al. | |
| 2006/0175837 A1 * | 8/2006 | Ignaczak | F16L 21/065 285/420 |
| 2007/0075542 A1 | 4/2007 | Glaze et al. | |
| 2009/0001712 A1 | 1/2009 | Webb et al. | |
| 2009/0021001 A1 | 1/2009 | Oh | |
| 2009/0051126 A1 | 2/2009 | King, Jr. et al. | |
| 2009/0302601 A1 * | 12/2009 | Sarkisyan | F16L 21/065 285/337 |
| 2010/0001519 A1 | 1/2010 | Komolrochanaporn | |
| 2010/0181759 A1 | 7/2010 | Quinn et al. | |
| 2011/0156383 A1 | 6/2011 | Bobst | |
| 2012/0256415 A1 * | 10/2012 | Dole | F16L 21/065 285/337 |
| 2014/0306449 A1 * | 10/2014 | Prevot | F16L 21/06 285/373 |
| 2015/0159794 A1 | 6/2015 | Bobo et al. | |
| 2015/0233506 A1 * | 8/2015 | Kim | F16L 21/065 285/337 |
| 2016/0223104 A1 * | 8/2016 | Webb | F16L 21/065 |
| 2016/0319967 A1 | 11/2016 | Yoo | |
| 2017/0097024 A1 * | 4/2017 | Drivon | F16L 21/065 |
| 2018/0283586 A1 | 10/2018 | Larson et al. | |
| 2020/0025316 A1 * | 1/2020 | Chiproot | F16L 21/065 |
| 2020/0103062 A1 * | 4/2020 | Belen | F16L 21/065 |
| 2020/0347967 A1 * | 11/2020 | Rigollet | F16L 21/065 |
| 2020/0347968 A1 * | 11/2020 | Clerc | F16L 21/065 |
| 2022/0145924 A1 * | 5/2022 | Bowman | F16L 17/04 |
| 2022/0178475 A1 | 6/2022 | Larson | |
| 2022/0178479 A1 | 6/2022 | Larson | |
| 2022/0260188 A1 * | 8/2022 | Bowman | F16L 17/04 |
| 2022/0341520 A1 | 10/2022 | Larson | |
| 2023/0392731 A1 | 12/2023 | Larson | |
| 2024/0344642 A1 | 10/2024 | Larson et al. | |
| 2025/0052349 A1 | 2/2025 | Larson | |

FOREIGN PATENT DOCUMENTS

| | | | | |
|---|---|---|---|---|
| CA | 2999727 A1 * | 10/2018 | | F16L 21/065 |
| DE | 3728898 A | 3/1989 | | |
| DE | 19800050 | 7/1998 | | |
| DE | 202004015506 | 3/2006 | | |
| DE | 202006005082 | 7/2006 | | |
| EP | 1930642 A2 | 6/2008 | | |
| EP | 3425253 | 1/2019 | | |
| FR | 866147 | 6/1941 | | |
| FR | 2515277 A1 * | 4/1983 | | F16L 17/04 |
| FR | 3010762 A1 * | 3/2015 | | F16L 21/06 |
| GB | 2389395 A * | 12/2003 | | F16L 17/04 |
| GB | 2518220 A * | 3/2015 | | F16L 17/04 |
| GB | 2584267 A * | 12/2020 | | F16L 17/04 |
| KR | 2003091904 | 12/2003 | | |
| KR | 200443803 | 3/2009 | | |
| KR | 20130052967 | 5/2013 | | |
| KR | 101501704 B1 * | 3/2015 | | F16L 17/04 |
| WO | WO-8002317 A1 * | 10/1980 | | F16L 17/04 |
| WO | WO-0077436 A1 * | 12/2000 | | F16L 21/065 |
| WO | WO-2006055966 A2 * | 5/2006 | | F16L 21/065 |
| WO | WO-2008097914 A1 * | 8/2008 | | F16L 17/04 |
| WO | WO-2020045749 A1 * | 3/2020 | | F16L 21/065 |
| WO | 2023043568 | 3/2023 | | |

OTHER PUBLICATIONS

Harco; Article entitled: "Philmac UTC How It Works", located at <http://www.harcofittings.com/Products/Philmac/UTC/utc_010.htm>, copyright 2013, accessed on Mar. 3, 2021, 1 pg.

Cambridge Bass; Article entitled: "Cambridge Coupling", located at <https://www.cambridgebrass.com/uploaded_files/CambridgeCouplingBrochure2013lr.pdf>, copyright 2013, 4 pgs.

Larson, Ryan Fairchild; Final Office Action for U.S. Appl. No. 17/110,827, filed Dec. 3, 2020, mailed Mar. 22, 2023, 29 pgs.

Larson, Ryan Fairchild; Final Office Action for U.S. Appl. No. 17/110,827, filed Dec. 3, 2020, mailed Jul. 29, 2022, 19 pgs.

Larson, Ryan Fairchild; Non-Final Office Action for U.S. Appl. No. 17/110,827, filed Dec. 3, 2020, mailed Nov. 8, 2022, 33 pgs.

Larson, Ryan Fairchild; Non-Final Office Action for U.S. Appl. No. 17/110,827, filed Dec. 3, 2020, mailed Apr. 13, 2022, 43 pgs.

Larson, Ryan Fairchild; Notice of Allowance for U.S. Appl. No. 17/110,827, filed Dec. 3, 2020, mailed Jul. 12, 2023, 11 pgs.

(56) References Cited

OTHER PUBLICATIONS

Larson, Ryan Fairchild; Non-Final Office Action for U.S. Appl. No. 17/475,425, filed Sep. 15, 2021, mailed Jan. 18, 2023, 36 pgs.

Larson, Ryan Fairchild; Notice of Allowance for U.S. Appl. No. 17/475,425, filed Sep. 15, 2021, mailed May 30, 2023, 10 pgs.

Harco; Article entitled: "Philmac 3G CTS How It Works", located at <http://www.harcofittings.com/Products/Philmac/3G/CTS/cts_020.htm>, publicly available prior to Mar. 23, 2021, 1 pg.

Larson, Ryan Fairchild; Non-Final Office Action for U.S. Appl. No. 17/236,365, filed Apr. 21, 2021, mailed May 26, 2023, 37 pgs.

Larson, Ryan Fairchild; International Search Report and Written Opinion for PCT Application No. PCT/US22/40780, filed Aug. 18, 2022, mailed Nov. 15, 2022, 8 pgs.

Brochure for Top Bolt Couplings, publicly available prior to May 22, 2022, 2 pgs.

Google search for "pack joint", publicly available prior to May 25, 2022, 2 pgs.

Krausz; Brochure for Hymax Grip, located at <https://krausz.com/wp-content/uploads/2019/09/BR0037_C_GRIP_40-300_LOW.pdf>, available on the Wayback Machine as early as Dec. 5, 2020, 5 pgs.

Krausz; Brochure for Hymax, located at <https://krausz.com/wp-content/uploads/2019/11/BR0036_F_HYMAX_40-1500_LOW.pdf>, available as early as May 22, 2022, 4 pgs.

Romac Industries; Article entitled: "Alpha Restrained Coupling", located at <ttps://romac.com/alpha-coupling>, available on the Wayback Machine as early as Mar. 4, 2018, 6 pgs.

Victaulic; Article entitled: "Victaulic QuickVic™ Style 107V Rigid Coupling", located at <https://www.victaulic.com/products/style-107v-quickvic-rigid-coupling/>, available on the Wayback Machine as early as Feb. 11, 2022, 2 pgs.

Conex Banninger; Article entitled: "The Grip Ring", located at <https://www.conexbanninger.com.au/why-conex/the-grip-ring/>, available on the Wayback Machine as early as Mar. 6, 2019, 3 pgs.

Larson, Ryan Fairchild; Applicant-Initiated Interview Summary for U.S. Appl. No. 17/236,365, filed Apr. 21, 2021, mailed Aug. 22, 2023, 2 pgs.

Larson, Ryan Fairchild; Non-Final Office Action U.S. Appl. No. 17/236,365, filed Apr. 21, 2021, mailed Mar. 21, 2024, 20 pgs.

Larson, Ryan Fairchild; International Preliminary Report on Patentability for PCT Application No. PCT/US22/40780, filed Aug. 18, 2022, mailed Mar. 28, 2024, 7 pgs.

Larson, Ryan Fairchild; Non-Final Office Action for U.S. Appl. No. 18/235,301, filed Aug. 17, 2023, mailed Nov. 13, 2024, 49 pgs.

Larson, Ryan Fairchild; Requirement for Restriction/Election for U.S. Appl. No. 18/235,301, filed Aug. 17, 2023, mailed Aug. 28, 2024, 6 pgs.

Screen capture from YouTube video clip entitled "Size Notches for Easy Identification of Pieces" 1 page, uploaded on Jul. 20, 2020 by user "StyleCAD". Retrieved from Internet: < https://www.youtube.com/watch?v=4-Klj5dcF6o>. (Year: 2020).

Larson, Ryan Fairchild; Final Office Action for U.S. Appl. No. 17/236,365, filed Apr. 21, 2021, mailed Sep. 28, 2024, 35 pgs.

Larson, Ryan Fairchild; Advisory Action for U.S. Appl. No. 18/235,301, filed Aug. 17, 2023, mailed Mar. 4, 2025, 3 pgs.

Larson, Ryan Fairchild; Final Office Action for U.S. Appl. No. 18/235,301, filed Aug. 17, 2023, mailed Feb. 4, 2025, 24 pgs.

Larson, Ryan Fairchild; Non-Final Office Action for U.S. Appl. No. 18/235,301, filed Aug. 17, 2023, mailed Apr. 7, 2025, 17 pgs.

Larson, Ryan Fairchild; Advisory Action for U.S. Appl. No. 17/236,365, filed Apr. 21, 2021, mailed Jan. 22, 2025, 3 pgs.

Larson, Ryan Fairchild; Extended European Search Report for European Patent Application No. 22870486.2, filed Aug. 18, 2022, mailed Apr. 10, 2025, 12 pgs.

Larson, Ryan Fairchild; Partial European Search Report for European Patent Application No. 22870486.2, filed Aug. 18, 2022, mailed Mar. 11, 2025, 13 pgs.

Larson, Ryan Fairchild; Non-Final Office Action for U.S. Appl. No. 17/236,365, filed Apr. 21, 2021, mailed Jun. 6, 2025, 45 pgs.

Larson, Ryan Fairchild; Requirement for Restriction/Election for U.S. Appl. No. 18/752,271, filed Jun. 24, 2024, mailed May 29, 2025, 6 pgs.

Larson, Ryan Fairchild; Final Office Action for U.S. Appl. No. 18/235,301, filed Aug. 17, 2023, mailed Jul. 30, 2025, 16 pgs.

Larson, Ryan Fairchild; Non-Final Office Action for U.S. Appl. No. 18/930,432, filed Oct. 29, 2024, mailed Aug. 7, 2025, 36 pgs.

Larson, Ryan Fairchild; Applicant-Initiated Interview Summary for U.S. Appl. No. 17/236,365, filed Apr. 21, 2021, mailed Sep. 10, 2025, 3 pgs.

\* cited by examiner

COMPRESSION FITTING

CROSS-REFERENCE TO RELATED APPLICATIONS

The present application claims the benefit of U.S. Provisional Application No. 63/345,725, filed May 25, 2022, which is hereby specifically incorporated by reference herein in its entirety.

TECHNICAL FIELD

This disclosure relates to a pipe fitting for connecting piping components. More specifically, this disclosure relates to a pipe fitting that can be easily tightened with a power tool.

BACKGROUND

Pipe fittings are commonly used to connect two piping components together to form a pipe connection, such as when installing a pipe system or a pipe infrastructure. Some pipe fittings require tightening one or more fasteners to secure the piping components to the pipe fitting. Typically, each of the fasteners is tightened using two wrenches, which can be difficult due to excessive torque and/or limited space surrounding the fitting within which to rotate the wrenches.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a compression fitting comprising a fitting body defining a locking projection; and a fastener assembly mounted to the fitting body and configured to tighten the compression fitting, the fastener assembly comprising: a threaded nut, wherein the locking projection contacts the threaded nut to prohibit rotation of the threaded nut; and a threaded fastener rotationally engaging the threaded nut.

A piping component is disclosed, the piping component comprising a component body defining an end portion; a sealing face defined at the body end and configured to engage a gasket; and a sealing groove formed in the sealing face.

Also disclosed is a compression fitting for engaging a piping component, the compression fitting configurable in a loosened configuration and a tightened configuration and comprising a fitting body defining a first end and a second end, a gap defined between the first end and the second end in the loosened configuration; and a fastener assembly mounted to the fitting body and configured to tighten the compression fitting from the loosened configuration to the tightened configuration; wherein, in the tightened configuration, the first end of the fitting body contacts and stops against the second end of the fitting body, and wherein contact between the first end and the second end in the tightened configuration indicates to a user that the fastener assembly is tightened to a required torque for the compression fitting to properly engage the piping component.

A method of tightening a compression fitting is also disclosed, the method comprising disposing at least a portion of a piping component within a fitting void of the compression fitting in a loosened configuration of the compression fitting, wherein the compression fitting defines a first end and a second end, and wherein a gap is defined between the first end and the second end in the loosened configuration; tightening a fastener assembly to draw the first end of the compression fitting towards the second end of the compression fitting; and contacting the first end of the compression fitting with the second end of the compression fitting in a tightened configuration of the compression fitting, and wherein contact between the first end and the second end in the tightened configuration indicates to a user that the fastener assembly is tightened to a required torque for the compression fitting to properly engage the piping component.

Additionally, disclosed is a compression fitting comprising a first fitting segment defining a first arcuate central section, a first retention rib extending radially inward from the first arcuate central section; a second fitting segment defining a second arcuate central section, a second retention rib ending radially inward from the second arcuate central section; and a grip ring defining a first ring end and a second ring end, wherein a split is defined between the first ring end and the second ring end, and wherein the first ring end engages the first retention rib and the second ring end engages the second retention rib.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
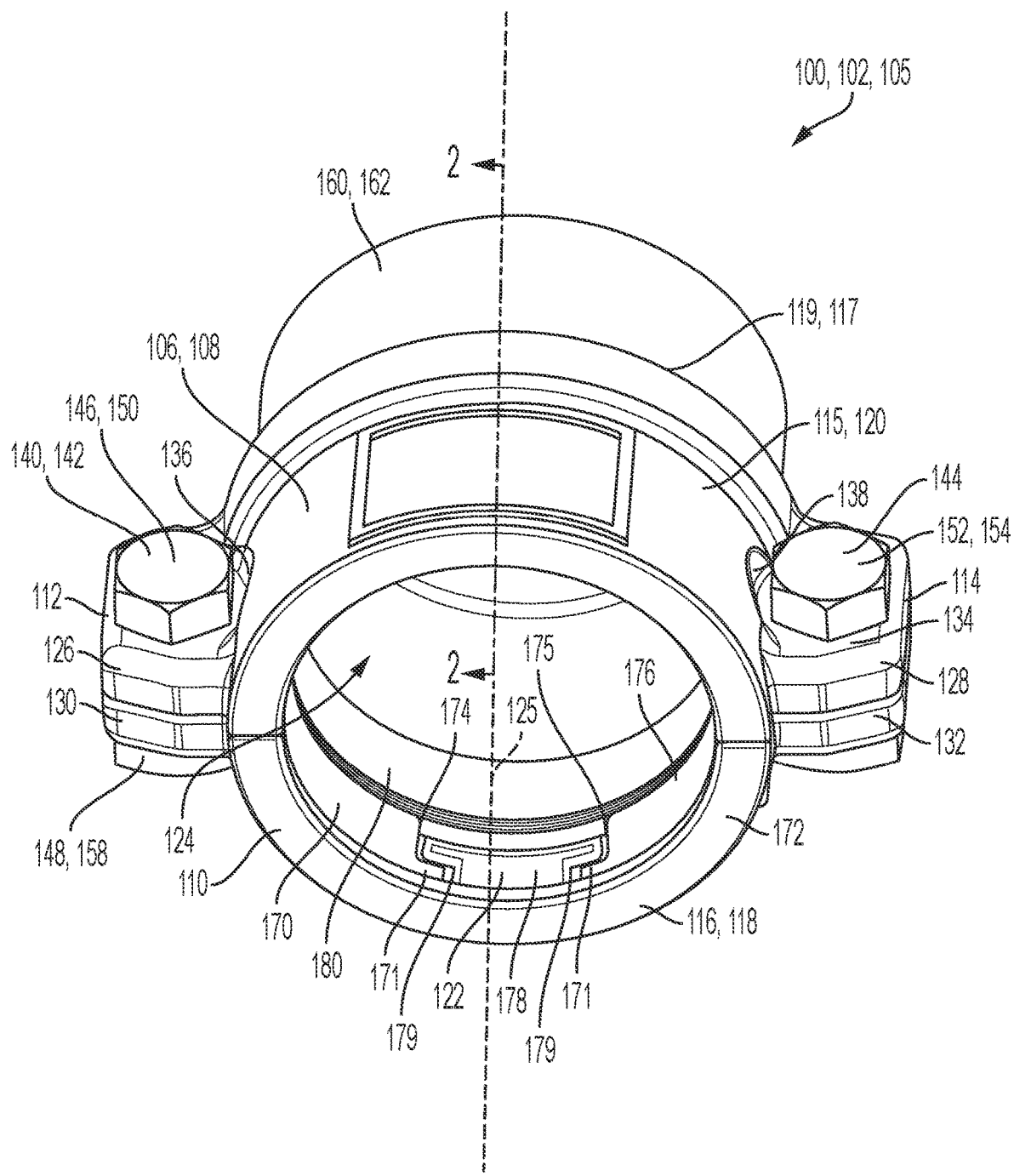
FIG. 1 is a top perspective view of a compression fitting in accordance with an example aspect of the present disclosure, the compression fitting comprising a fitting body and a pair of fastener assemblies.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a pipe fitting for connecting piping components and associated methods, systems, devices, and various apparatus. The pipe fitting can comprise a fitting body and a fastener assembly that can be easily tightened by a tool. It would be understood by one of skill in the art that the disclosed pipe fitting is described in but a few exemplary aspects among many. No particular terminology or description should be considered limiting on the disclosure or the scope of any claims issuing therefrom.

A first aspect of a pipe fitting 100, and more specifically, a compression fitting 102, is disclosed and described in FIGS. 1-9. The compression fitting 102 can be a pipe cap fitting 105, as shown, or can be any other suitable type of fitting, including but not limited to, an adapter, tee, elbow, flange, pipe coupling, and the like. Referring to FIG. 1, the pipe fitting 100 can be configured to connect to one or more piping components. For example, the pipe fitting 100 can be connected to a first piping component 310 (shown in FIG. 3) and a second piping component 160. The first and second piping components 310, 160 can comprise pipe segments, any suitable fitting, valves, or the like. In the present aspect, the first piping component 310 can be a pipe segment 312 (shown in FIG. 3) and the second piping component 160 can be a cap 162, and the cap 162 can be considered part of the pipe cap fitting 105. Example aspects of the pipe cap fitting 105 can comprise a fitting body 106. The fitting body 106 can comprise a first fitting segment, such as an upper fitting segment 108, and a second fitting segment, such as a lower fitting segment 110. As shown, each of the upper and lower fitting segments 108, 110 can be substantially C-shaped (e.g., substantially semi-circular). In other aspects, the pipe cap fitting 105 can comprise more or fewer fitting segments.

In example aspects, each of the upper and lower fitting segments 108, 110 can define a first end 112, an opposing second end 114, and a central section 115 between the first end 112 and second end 114. The central section 115 can be substantially arcuate in the present aspect. Additionally, each of the upper and lower fitting segments 108, 110 can define a front segment end 116 and a rear segment end 117. The front segment ends 116 can define an axially front end 118 of the pipe cap fitting 105 and the rear segment ends 117 can define an axially rear end 119 of the pipe cap fitting 105. Each of the upper and lower fitting segments 108, 110 can further define an outer surface 120 and an inner surface 122, and the inner surface 122 of the upper fitting segment 108 can face the inner surface 122 of the lower fitting segment 110. The central sections 115 of the upper and lower fitting segments 108, 110 can define a fitting void 124 therebetween, and a fitting axis 125 can extend through a center of the fitting void 124, as shown. A cap end portion 264 (shown in FIG. 2) of the cap 162 can engage the fitting void 124 at the rear end 119 of the pipe cap fitting 105, and a segment end 314 (shown in FIG. 3) of the pipe segment 312 can engage the fitting void 124 at the front end 118 of the pipe cap fitting 105.

In example aspects, the upper and lower fitting segments 108, 110 can comprise a cast material, such cast brass in some aspects. In other example aspects, the upper and lower fitting segments 108, 110 can be formed from another suitable material, or a combination of materials, that are known in the art, including but not limited to other metals, plastics, composites, and the like. Each of the upper and lower fitting segments 108, 110 can be cast monolithically (i.e., formed a singular component that constitutes a single material without joints or seams). In some aspects, the monolithic castings of the upper and lower fitting segments 108, 110 do not require any precision-machining. Additionally, in example aspects, the cap 162 can also comprise a cast material, such cast brass in some aspects. In other example aspects, the cap 162 can be formed from another suitable material, or a combination of materials, that are known in the art, including but not limited to other metals, plastics, composites, and the like. In other aspects, the upper and lower fitting segments 108, 110 and/or the cap 162 can be formed by any other suitable manufacturing process.

A first upper fastener lug 126 can be formed at the first end 112 of the upper fitting segment 108, and a second upper fastener lug 128 can be formed at the second end 114 of the upper fitting segment 108. Each of the first and second upper fastener lugs 126, 128 can extend radially outward from the central section 115 of the upper fitting segment 108. Similarly, a first lower fastener lug 130 can be formed at the first end 112 of the lower fitting segment 110, and a second lower fastener lug 132 can be formed at the second end 114 of the lower fitting segment 110. Each of the first and second lower fastener lugs 130, 132 can extend radially outward from the central section 115 of the lower fitting segment 110. Thus, the central section 115 of the upper fitting segment 108 can extend between the first and second upper fastener lugs 126, 128, and the central section 115 of the lower fitting segment 110 can extend between the first and second lower fastener lugs 130, 132. In example aspects, each of the central sections 115 can define a substantially arcuate shape.

Each of the first and second upper fastener lugs 126, 128 and the first and second lower fastener lugs 130, 132 can define a lug opening 540 (shown in FIG. 5) formed therethrough. According to example aspects, the lug opening 540 of the first upper fastener lug 126 can be substantially aligned with the lug opening 540 of the first lower fastener lug 130. Similarly, the lug opening 540 of the second upper fastener lug 128 can be substantially aligned with the lug opening 540 of the second lower fastener lug 132. Example aspects of the pipe cap fitting 105 can further comprise a pair of fastener assemblies 140. For example, a first fastener assembly 142 of the pair of fastener assemblies 140 can extend through the lug openings 540 of the first upper fastener lug 126 and the first lower fastener lug 130 to couple the upper fitting segment 108 to the lower fitting segment 110 at the first ends 112 thereof. A second fastener assembly 144 of the pair of fastener assemblies 140 can extend through the lug openings 540 of the second upper fastener lug 128 and the second lower fastener lug 132 to couple the upper fitting segment 108 to the lower fitting segment 110 at the second ends 114 thereof. In other aspects, the pipe cap fitting 105 may comprise additional fastener assemblies 140 or may comprise only one fastening assembly 140, as described in further detail below.

The first and second fastener assemblies 142, 144 can be tightened to secure the upper and lower fitting segments 108, 110 to the cap 162 and the pipe segment 312. According to example aspects, each of the first and second fastener assemblies 142, 144 can comprise a threaded fastener 146. In some aspects, one or both of the first and second fastener assemblies 142, 144 can further comprise a threaded nut 148. In the present aspect, the threaded fastener 146 can be a hex head set screw 150 and the threaded nut 148 can be a threaded square nut 158. In other aspects, the fastener assemblies 140 can comprise any other suitable types of fastener and/or nut. Each of the hex head set screw 150 and the threaded square nut 158 can comprise stainless steel in the present aspect. Referring to the first fastener assembly 142, a head portion 152 (e.g., a hex head 154) of the threaded fastener 146 (e.g., the hex head set screw 150) can abut an outer lug surface 134 of the first upper fastener lug 126. A threaded tail 656 (shown in FIG. 6) of the threaded fastener 146 can extend through the lug openings 540 of the first upper fastener lug 126 and the first lower fastener lug 130. The threaded square nut 158 can be threadably engaged with a distal end 610 (shown in FIG. 6) of the threaded tail 656 and can abut the outer lug surface 134 of the first lower fastener lug 130. In other aspects, either or both of the first and second fastener assemblies 142, 144 may not comprise the threaded nut 148, and the threaded fastener 146 (i.e., the hex head set screw 150) can mate with internal threading of the corresponding first or second lower fastener lug 130, 132. More specifically, the internal threading can be formed with the lug opening 540 of the first and/or second fastener lug 130, 132.

In example aspects, the threaded square nut 158 can be prohibited from rotation on the threaded tail 656, as described in further detail below, and as such, the hex head set screw 150 can be rotated relative to the threaded square nut 158 to tighten the first fastener assembly 142, as described. The second fastener assembly 144 can engage the second upper fastener lug 128 and the second lower fastener lug 132 and can be tightened in the same manner. According to example aspects, the outer surface 120 of the upper fitting segment 108 can define a first clearance recess 136 formed in the central section 115 adjacent to the first upper fastener lug 126. Similarly, the outer surface 120 of the upper fitting segment 108 can define a second clearance recess 138 formed in the central section 115 adjacent to the second upper fastener lug 128. The first and second clearance recesses 136, 138 can provide a suitable clearance for the corresponding threaded fasteners 146 (e.g., the hex head set screws 150) to rotate as the first and second fastener assemblies 142, 144 are tightened. The first and second clearance recesses 136, 138 can also provide a suitable clearance for a socket 2110 (shown in FIG. 21) of a tightening tool to engage the head portion 152 of each threaded fastener 146 during tightening. In example aspects, the tightening tool can be a power tool, including but not limited to an impact gun, a drill gun, or any other suitable power tool known in the art. In other aspects, the tightening tool can be a manually operated tool, such as a ratchet wrench, for example and without limitation. In addition to providing clearance for the tightening tool, the first and second clearance recesses 136, 138 can also reduce material costs and reduce the weight of the upper and lower fitting segments 108, 110.

In other aspects, instead of the second upper fastener lug 128, the second lower fastener lug 132, and the second fastener assembly 144, the upper and lower fitting segments 108, 110 can be hingedly connected at their corresponding second ends 114 by hinge mechanism, which can be, for example and without limitation, a link pin or mating tongue and groove components cast monolithically with the upper and lower fitting segments 108, 110.

In some example aspects, the upper and lower fitting segments 108, 110 can be assembled together around a joint between the first piping component 310 and the second piping component 160, and the first and second fastener assemblies 142, 144 can be tightened to clamp the upper and lower fitting segments 108, 110 around the first and second piping components 310, 160. In other example aspects, the upper and lower fitting segments 108, 110 can be pre-assembled with each of the first and second fastener assemblies 142, 144 in a loosened configuration, such that the fitting void 124 of the pipe cap fitting 105 can be widened to allow the first and second piping components 310, 160 to be inserted therein. The pre-assembled fitting segments 108, 110 can be placed onto and slid over the first pipe component 310, and the second piping component 160 can then be aligned with the first piping component 310. The upper and lower fitting segments 108, 110 can be slid back to cover the joint between the first and second piping components 310, 160, and the fastener assemblies 140 can be tightened. In other aspects, the upper and lower fitting segments 108, 110 can be assembled together around the first piping component 310, and the first and second fastener assemblies 142, 144 can then be just slightly tightened to the loosened configuration. With the pipe cap fitting 105 now in the pre-assembled configuration, the second piping component 160 can be inserted into the fitting void 124 and the fastener assemblies 140 can be tightened.

In example aspects, the pipe cap fitting 105 can further comprise a grip ring 170 and/or an annular gasket 180 (or other suitable seal) disposed within the fitting void 124 and configured to engage (e.g., to grip and/or seal with) an outer piping surface 318 (shown in FIG. 3) of the first piping component 310. In the present aspect, the pipe cap fitting 105 comprises both of the grip ring 170 and the gasket 180. Other aspects may comprise the grip ring 170 only. Other aspects may comprise the gasket 180 or other suitable seal only. Example aspects of the grip ring 170 and example aspects of the gaskets 180 are disclosed in U.S. patent application Ser. No. 17/110,827, filed Dec. 3, 2020, and in U.S. patent application Ser. No. 17/475,425, filed Sep. 15, 2021, each of which is hereby incorporated by reference herein in its entirety. As shown, the grip ring 170 can be retained within the fitting void 124 by an annular retaining lip 172 extending radially inward at the front end 118 of the pipe cap fitting 105. The grip ring 170 can be substantially arcuate and can be shaped as a split ring, and can define a first circumferential ring end 174 and a second circumferential ring end 175 opposite the first circumferential ring end 174. As the fastener assemblies 140 are tightened, the fitting segments 108, 110 can push the grip ring 170 radially inward. The grip ring 170 can flex or bend and first circumferential ring end 174 can move towards the second circumferential ring end 175, reducing the diameter of the grip ring 170 and pressing an engagement edge(s) 176 of the grip ring 170 into the outer piping surface 318 (shown in FIG. 3) of the first piping component 310.

The engagement edge 176 in the present aspect can be a substantially arcuate, continuous engagement edge 176. In other aspects, the engagement edge(s) 176 of the grip ring 170 may not be substantially arcuate and/or continuous. For example and without limitation, in another aspect, the grip ring 170 can define a plurality of spaced-apart teeth, each defining an engagement edge segment. In aspects of the pipe fitting 100 not comprising the grip ring 170, either or both of the upper and lower fitting segments 108, 110 may define the engagement edge(s) 176 for gripping and/or biting into the outer piping surface 318. For example and without limitation, in a particular aspect, the annular retaining lip 172 could be sharpened to bite into the outer piping surface 318 when the pipe fitting 100 is tightened. Other aspects of the pipe fitting 100 may not comprise either of the grip ring 170 and the sharpened retaining lip 172, and the gasket 180 or other seal can suitably engage the first piping component 310.

In some aspects, the lower fitting segment 110 or the upper fitting segment 108 can define a retention rib 178 configured to engage and serve as a stop for the first and second circumferential ring ends 174, 175 in a tightened configuration of the compression fitting 102. For example, in the present aspect, the retention rib 178 can be substantially T-shaped and can define a pair of opposing rib notches 179. The grip ring 170 can define a pair of opposing ring tabs 171. A first one of the ring tabs 171 can project from the first circumferential ring end 174 and can engage a first one of the rib notches 179, and a second one of the ring tabs 171 can project from the second circumferential ring end 175 and can engage a second one of the rib notches 179. In example aspects, the grip ring 170 can be formed from a metal material, such as, for example, stainless steel. Other aspects of the grip ring 170 can be formed from other metal materials, plastics, composites, or any other material known in the art having suitable strength for gripping pipes and tubing of varying materials.

Figure 2:
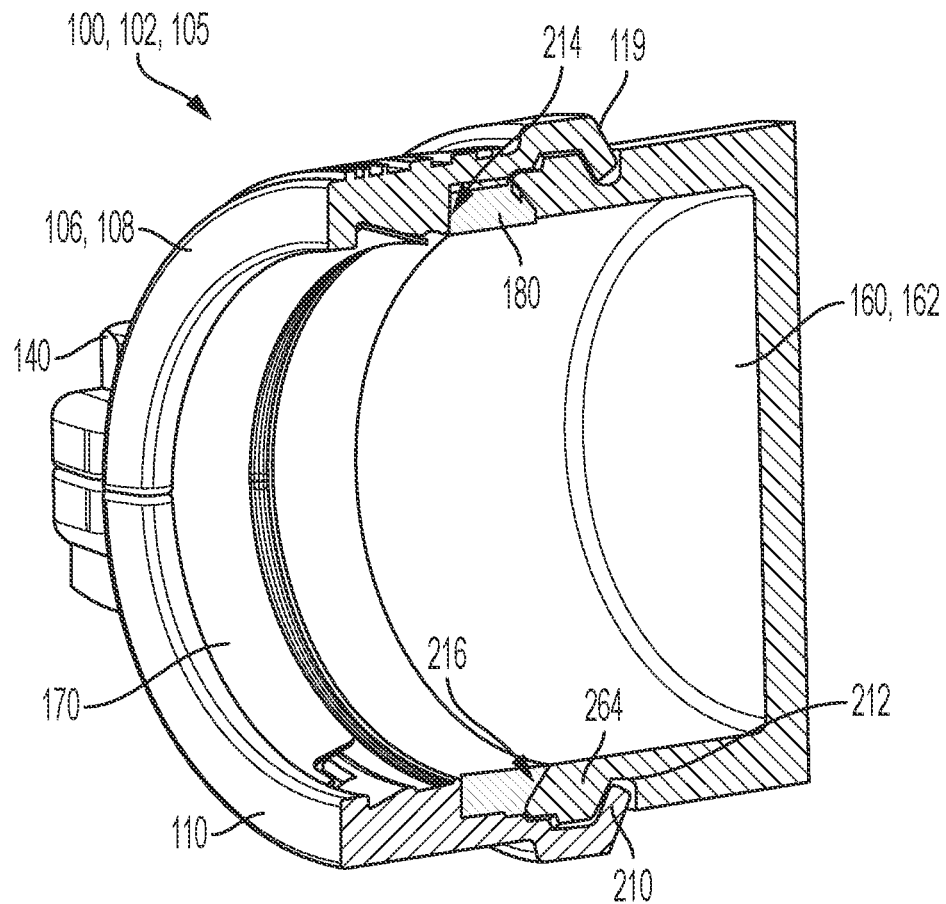
FIG. 2 is a cross-sectional view of the compression fitting of FIG. 1 taken along line 2-2 in FIG. 1.
Figure 3:
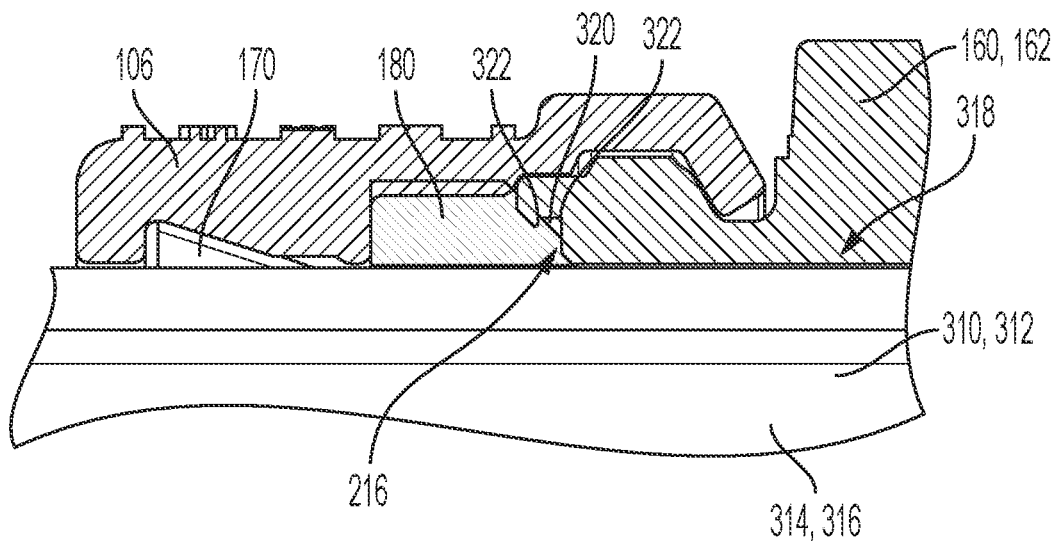
FIG. 3 is a detail cross-sectional view of the compression fitting of FIG. 1 taken along line 2-2 in FIG. 1.

Referring to FIGS. 2 and 3, the pipe cap fitting 105 can further define an annular engagement lip 210 angled radially inward at the rear end 119 of the pipe cap fitting 105. The annular engagement lip 210 can engage an angled, annular engagement groove 212 formed at the cap end portion 264 of the cap 162 to retain the pipe cap fitting 105 on the cap 162. In some aspects, the annular engagement lip 210 can be configured to rotate within the annular engagement groove 212 to allow the pipe cap fitting 105 to be reoriented relative to the second piping component 160. The pipe cap fitting 105 can be reoriented to improve accessibility to the fastener assemblies 140 for quicker and easier installation. In example aspects, the gasket 180 can be disposed between the cap end portion 264 and a radially-inward extending gasket shoulder 214 of the fitting body 106. As the pipe cap fitting 105 is tightened, the gasket 180 can be compressed radially inward by the upper and lower fitting segments 108, 110 to seal against the outer piping surface 318 (shown in FIG. 3) of the first piping component 310 (shown in FIG. 3). Additionally, the angled orientation of the engagement lip 210 and the engagement groove 212 can bias the cap end portion 264 axially towards the gasket 180, further compressing the gasket 180 between a sealing face 216 of the cap end portion 264 and the gasket shoulder 214 and improving the seal of the gasket 180 with the first piping component 310.

Referring to FIG. 3, each of the grip ring 170 and the gasket 180 can engage the first piping component 310 (e.g., the pipe segment 312). In the present aspect, the segment end 314 of the pipe segment 312 can be a plain end 316. Plain ends 316 can be ends that do not define a designated groove or shoulder to be engaged by the upper and/or lower fitting segments 108, 110 (lower fitting segment 110 shown in FIG. 1). In some aspects, as shown, the second piping component 160 (e.g., the cap 162) can define a sealing groove 320 formed in the sealing face 216 thereof. According to example aspects, the gasket 180 can comprise a resilient, flexible material, and can extrude into the sealing groove 320 when compressed. For example, in some aspects, the gasket 180 can comprise a rubber material such as EPDM rubber. In other aspects, the gasket 180 can comprise any suitable flexible and resilient material known in the art, including but not limited to, various types of rubbers, foams, plastics, and the like. In example aspects, the sealing groove 320 can define one or more corners 322. Compression of the gasket 180 into the sealing groove 320, and particularly into the corners 322 of the sealing groove 320, can improve the sealing pressure of the gasket 180 against the first piping component 310 without having to increase the torque to which the fastener assemblies 140 (shown in FIG. 1) are tightened. In some aspects, the cap 162 can be cast without the need for precision-machining the sealing groove 320 and/or the sealing face 216 after casting. In other aspects, however, the sealing groove 320 and/or sealing face 216 may be machined.

Figure 4:
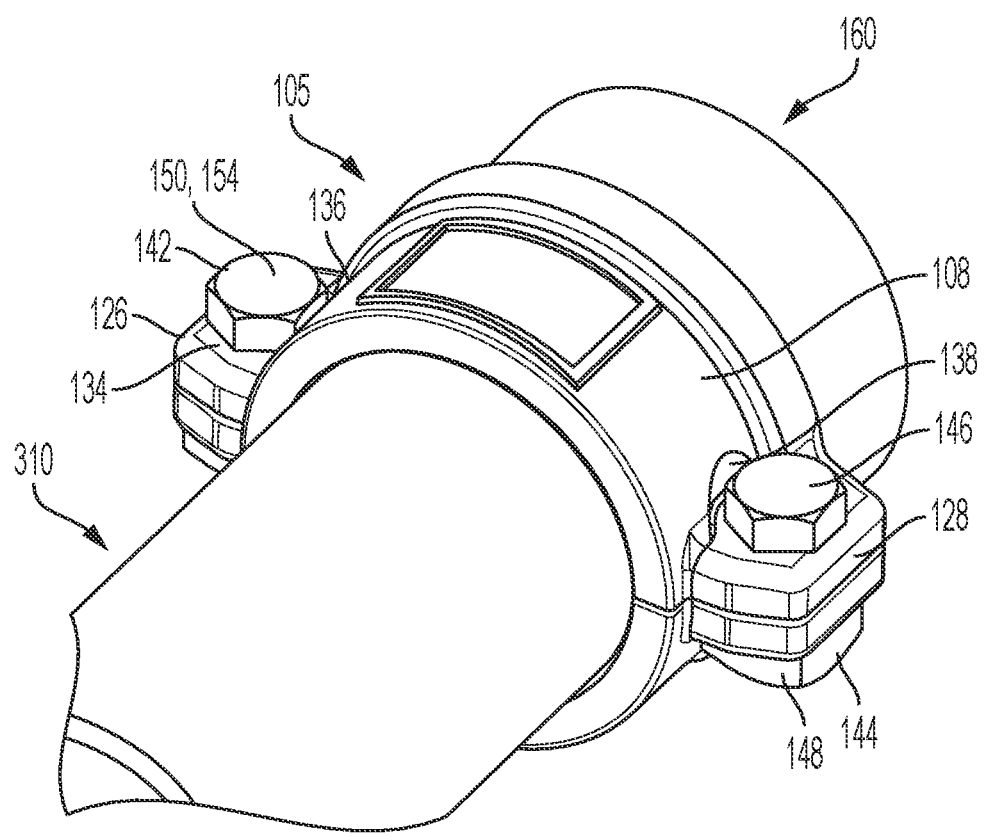
FIG. 4 is a top perspective view of the compression fitting of FIG. 1 coupled to a pipe.

FIG. 4 illustrates a top perspective view of the pipe cap fitting 105 coupled to the first piping component 310 and the second piping component 160 by the first and second fastener assemblies 142, 144. As shown, the upper fitting segment 108 can define the first and second clearance recesses 136, 138 adjacent to the first and second upper fastener lugs 126, 128, which can provide ample clearance for the threaded fasteners 146 to be tightened relative to the corresponding stationary threaded nuts 148. In the tightened configuration of pipe fitting 100, as shown, the hex head 154 of each hex head set screw 150 can abut the outer lug surface 134 of the corresponding first or second upper fastener lug 126, 128. The hex heads 154 can be sized to prohibit passage of the hex heads 154 through the lug openings 540 (shown in FIG. 5) of the corresponding first and second upper fastener lugs 126, 128.

Figure 5:
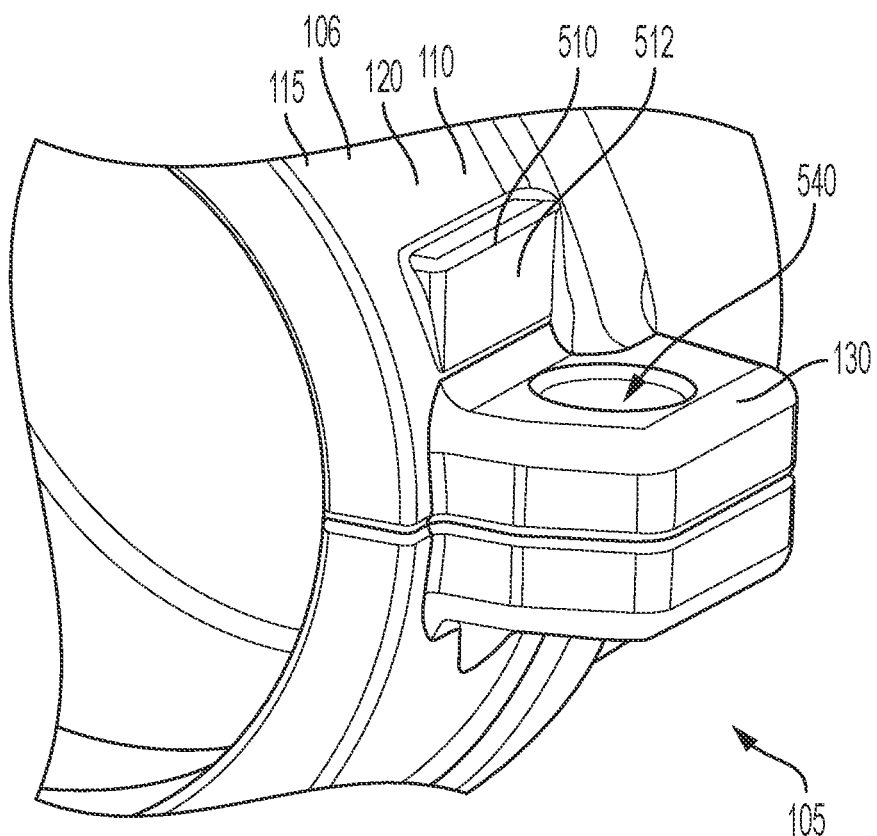
FIG. 5 is a bottom perspective view of a fastening arrangement of the fitting body of FIG. 1.

FIG. 5 illustrates a bottom perspective view of the fitting body 106 of the pipe cap fitting 105. According to example aspects, the outer surface 120 of the lower fitting segment 110 can define a first locking projection 510 extending from the central section 115 adjacent to the first lower fastener lug 130. Similarly, the outer surface 120 of the lower fitting segment 110 can define a second locking projection 810 (shown in FIG. 8) extending the central section 115 adjacent to the second lower fastener lug 132 (shown in FIG. 1). Each of the first and second locking projections 510, 810 can define a substantially planar locking face 512, which in the present aspect, can be oriented about perpendicular to the corresponding first and second lower fastener lugs 130, 132. The substantially planar locking face 512 of the first locking projection 510 can be configured to engage the threaded nut 148 (shown in FIG. 1) of the corresponding first fastener assembly 142 (shown in FIG. 1) to prohibit rotation of the threaded nut 148.

Figure 6:
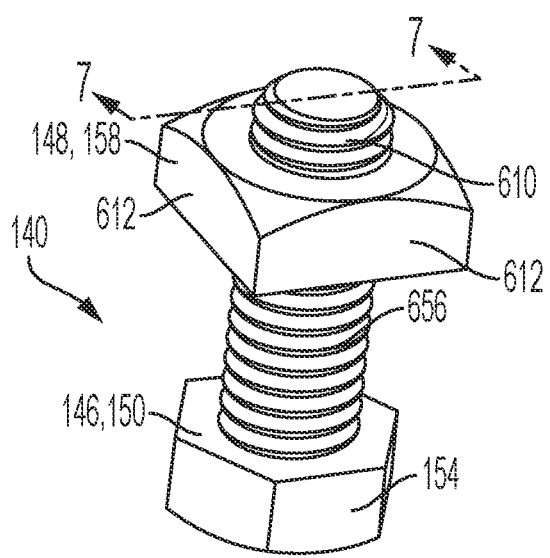
FIG. 6 is a perspective view of one of the fastener assemblies FIG. 1.
Figure 7:
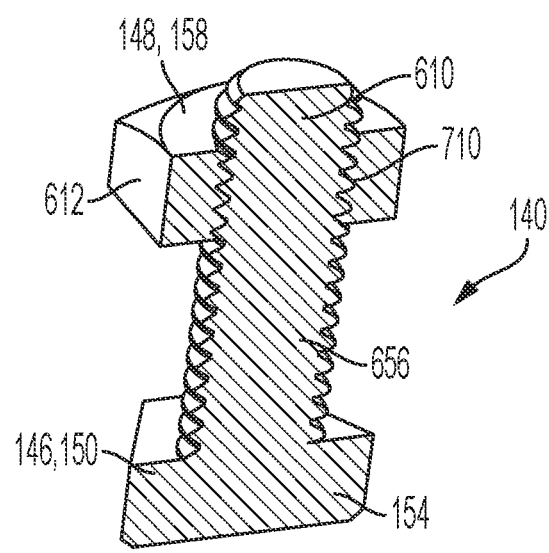
FIG. 7 is a cross-sectional view of the fastener assembly of FIG. 1 taken along line 7-7 in FIG. 6.

FIGS. 6 and 7 illustrate perspective and cross-sectional views, respectively, of one of the fastener assemblies 140. The fastener assembly 140 can comprise the threaded fastener 146 (e.g., the hex head set screw 150) and the threaded nut 148 (e.g., the threaded square nut 158). The hex head set screw 150 can define the hex head 154 and the threaded tail 656 extending therefrom. The threaded square nut 158 can be mounted to the distal end 610 of the threaded tail 656. The threaded square nut 158 can define a threaded opening 710 (shown in FIG. 7), and the threaded tail 656 can matingly and rotationally engage the threaded opening 710. Example aspects of the threaded square nut 158 can define a plurality of planar side faces 612. For example, the threaded square nut 158 can define four of the planar side faces 612 in the present aspect. One of the planar side faces 612 can be configured to abut the substantially planar locking face 512 (shown in FIG. 5) of the corresponding first or second locking projection 510, 810 (shown in FIGS. 5 and 8, respectively) of the lower fitting segment 110 (shown in FIG. 1) to prevent rotation of the threaded square nut 158.

Figure 8:
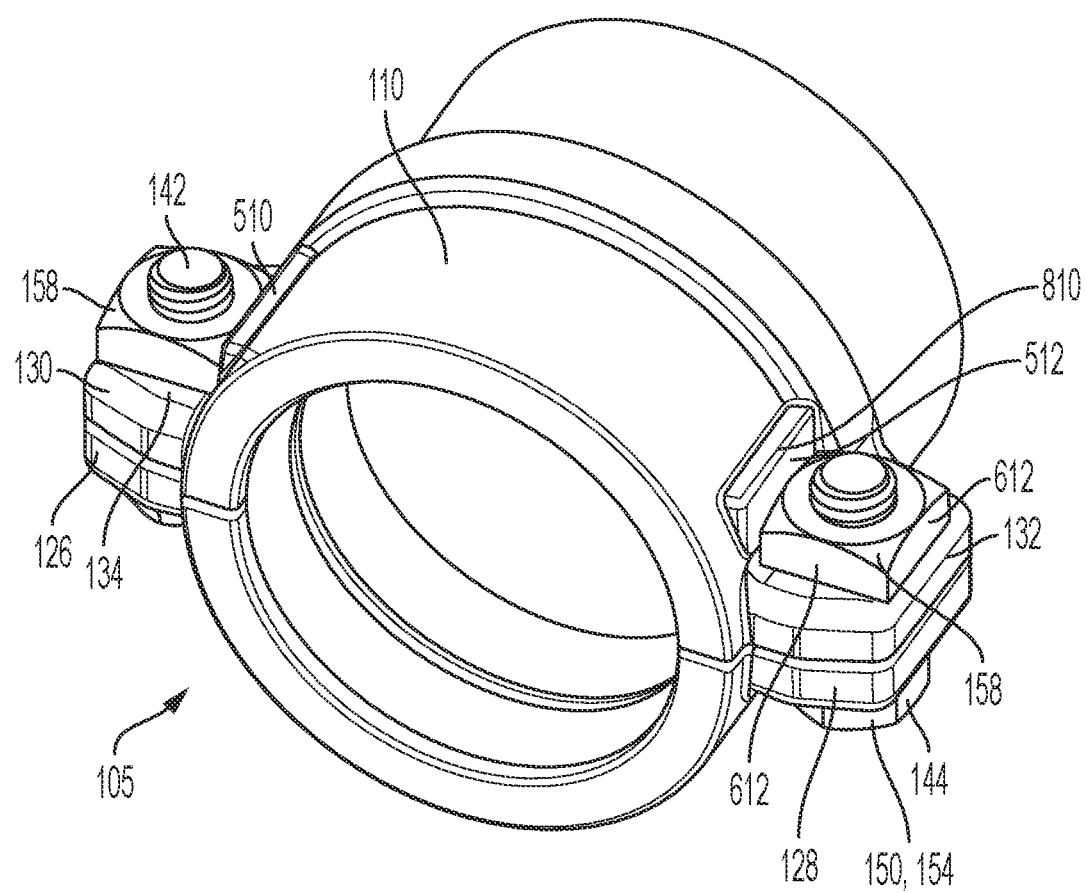
FIG. 8 is a bottom perspective view of the compression fitting of FIG. 1.

FIG. 8 illustrates a bottom perspective view of the pipe cap fitting 105. As shown, the lower fitting segment 110 can define the first and second locking projections 510, 810 adjacent to the first and second lower fastener lugs 130, 132. One of the planar side faces 612 of each threaded square nut 158 can abut the substantially planar locking face 512 of the corresponding first or second locking projection 510, 810. The first and second fastener assemblies 142, 144 can be tightened by rotating each hex head set screw 150 relative to the corresponding stationary threaded square nut 158 to draw the hex head 154 towards the threaded square nut 158. As each hex head 154 is drawn towards the corresponding threaded square nut 158, the first upper fastener lug 126 can be drawn towards the first lower fastener lug 130 and the second upper fastener lug 128 can be draw towards the second lower fastener lug 132.

In a loosened configuration of the pipe fitting 100, a gap 924 (shown in FIG. 9) can be defined between the first ends 112 of the upper and lower fitting segments 108, 110 and between the second ends 114 of the upper and lower fitting segments 108, 110. In the tightened configuration of the pipe fitting 100, as shown, each of the threaded square nuts 158 can abut the outer lug surface 134 of the corresponding first or second upper fastener lug 126, 128. The threaded square nuts 158 can be sized to prohibit passage of the threaded square nuts 158 through the lug openings 540 (shown in FIG. 5) of the corresponding first and second lower fastener lugs 130, 132. According to example aspects, the first fastener assembly 142 can be tightened until the first upper fastener lug 126 contacts and stops against the first lower fastener lug 130, and the second fastener assembly 144 can be tightened until the second upper fastener lug 128 contacts and stops against the second lower fastener lug 132. When the first and second upper fastener lugs 126, 128 contact the first and second lower fastener lugs 130, 132, respectively, it can indicate to a user that the first and second fastener assemblies 142, 144 have been tightened to the required torque for the pipe cap fitting 105 to properly grip the first and second piping components 310, 160.

Figure 9:
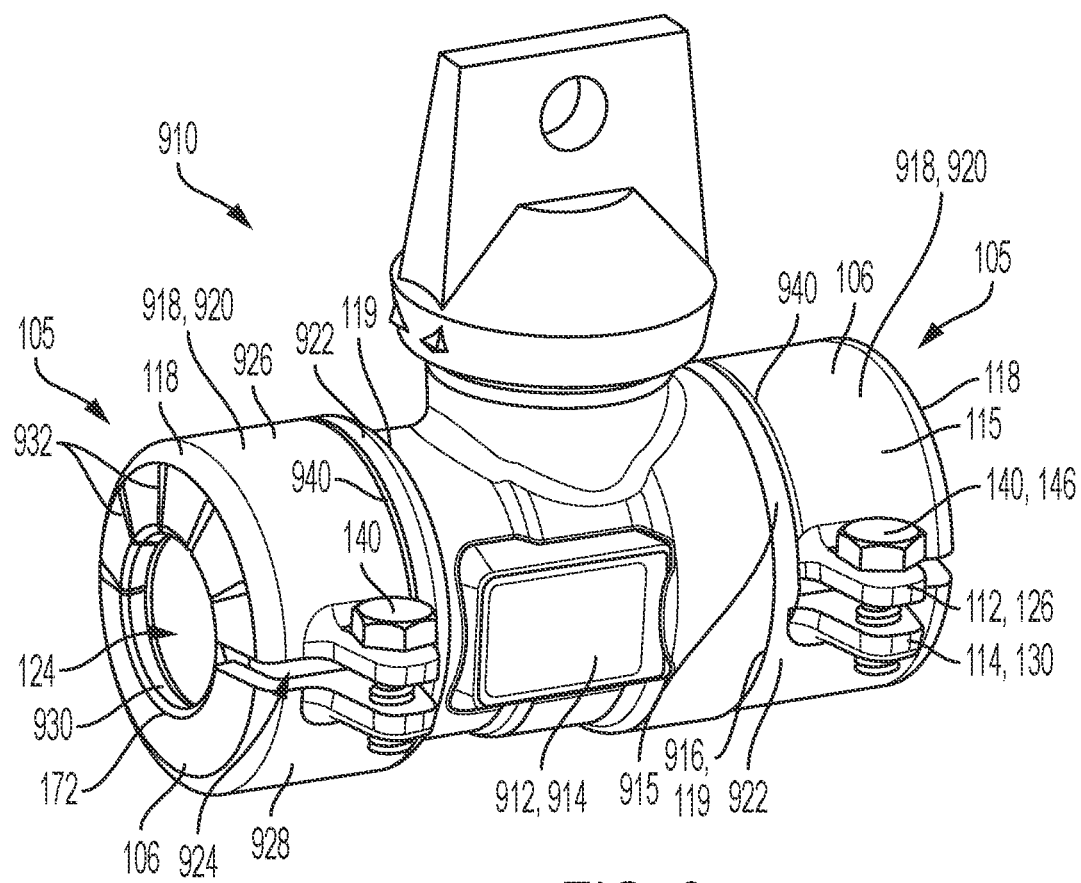
FIG. 9 is a top perspective view of an assembly comprising a pair of compression fittings in accordance with another aspect of the present disclosure, wherein each compression fitting comprises the fitting body and only one of the fastener assemblies.
Figure 10:
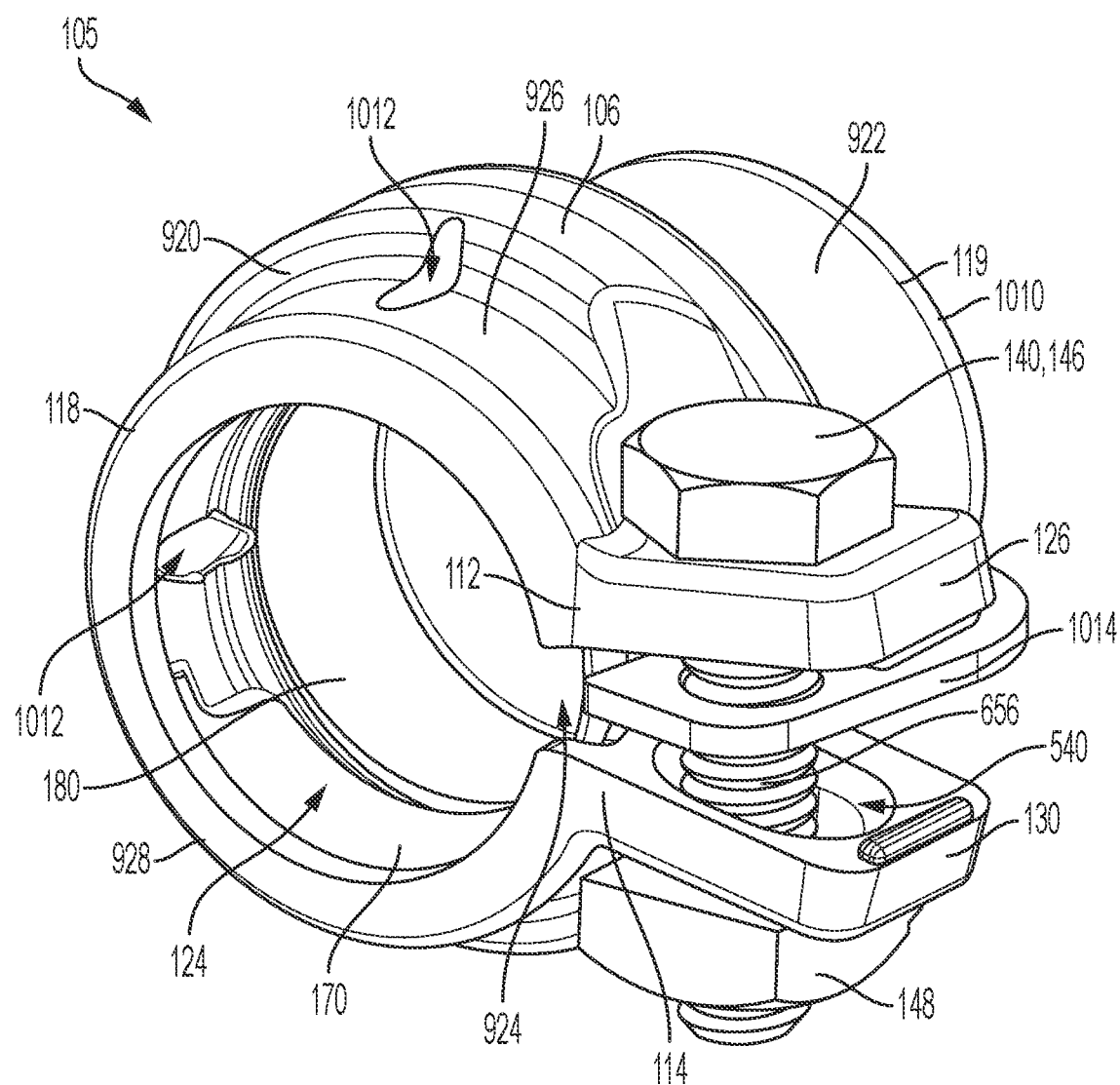
FIG. 10 is a top perspective view of the compression fitting in accordance with another aspect of the present disclosure, wherein the compression fitting comprises the fitting body and only one of the fastener assemblies.

FIG. 9 illustrates a fitting assembly 910 comprising a valve 912 and a pair of the pipe fittings 100 in accordance with another aspect of the disclosure. The valve 912 can be a ball valve 914 in the present aspect. In other aspects, the valve 912 can be any other suitable type of valve 912, including but not limited to, gate valves, butterfly valves, check valves, and the like. The pair of pipe fittings 100 can be substantially identical in the present aspect. According to example aspects, a first pipe fitting 100a of the pair of pipe fittings 100 can be cast monolithically with the valve 912. A second pipe fitting 100b of the pair of pipe fittings 100 can be cast monolithically with a valve end piece 915, which can be connected to the valve 912 (for example, by a threaded connection or any other suitable connection). In other aspects, both of the first and second pipe fittings 100a,b can be formed monolithically with the valve 912. In other aspects, neither of the first and second pip fittings 100a,b can be formed monolithically with the valve 912.

Furthermore, in the present aspect, instead of multiple fitting segments 108, 110 (shown in FIG. 1), the fitting body 106 of each pipe fitting 105 can comprise a single segment 918 cast monolithically from a suitably flexible metal material, such as brass, as described in further detail below. Thus, in the present aspect, each of pipe fitting 105 need only comprise one of the fastener assemblies 140. In other aspects, the fitting body 106 can be cast from any other suitable material, including, but not limited to, other metals, plastics, composites, and the like.

According to example aspects, the fitting body 106 of each pipe fitting 105 can define a substantially cylindrical shape and can comprise a front body portion 920 formed at the front end 118 of the fitting body 106 and a rear body portion 922 formed at the rear end 119 of the fitting body 106. The front body portion 920 of the fitting body 106 can define the gap 924, as shown. The front body portion 920 can define the first end 112, the second end 114, and the central section 115 extending circumferentially around the fitting body 106 from first end 112 to the second end 114. The first end 112 can face the second end 114 with the gap 924 formed therebetween. Example aspects the front body portion 920 can generally define a substantially C-shaped upper front segment 926 defining the first end 112 and a substantially C-shaped lower front segment 928 opposite the upper front segment 926 and defining the second end 114. The fitting void 124 can extend through the fitting body 106 from the front end 118 to the rear end 119. The gasket 180 (shown in FIG. 1) and the grip ring 170 (shown in FIG. 1) can be disposed within the fitting void 124. In the present aspect, the rear end 119 of the first pipe fitting 100a can be monolithically formed with the valve 912. Moreover, the rear end 119 of the second pipe fitting 100b can also define a rear end 916 of the valve end piece 916 that is connected to the 912.

The fitting body 106 can define the annular retaining lip 172 extending radially inward at the front end 118 of the pipe fitting 105. The annular retaining lip 172 can define an inner lip edge 930. In the present aspect, the annular retaining lip 172 can define a plurality of relief notches 932 in the upper front segment 926 of the fitting body 106. Each of the relief notches 932 can extend radially outward from the inner lip edge 930, as shown. In some aspects, the annular retaining lip 172 can also or alternatively define the relief notches 932 in the lower front segment 928 of the fitting body 106. In example aspects, as shown, the fitting body 106 can further define a substantially circumferential upper slot 940 extending substantially about the upper front segment 926 at the joint between the front body portion 920 the rear body portion 922.

The circumferential upper slot 940, the relief notches 932, and the flexibility of the brass material of the fitting body 106 can permit the upper front segment 926 of the front body portion 920 to flex relative to the lower front segment 928 as the corresponding fastener assembly 140 is tightened. In some aspects, the relief notches 932 can define a substantially triangular shape (i.e., wider at the inner lip edge 930) when the corresponding fastener assembly 140 is loosened. In the tightened configuration of the pipe fitting 100, the relief notches 932 can be pinched at the inner lip edge 930, as shown. According to example aspects, the first upper fastener lug 126 can be formed at the first end 112 of the front body portion 920, and the first lower fastener lug 130 can be formed at the second end 114 of the front body portion 920. The fastener assembly 140 can comprise the threaded fastener 146 and the threaded nut 148 (shown in FIG. 1), and can be tightened in the same manner as described above. As the fastener assembly 140 is tightened and the upper front segment 926 flexes towards the lower front segment 928, the first end 112 can be drawn towards the second end 114 and an inner diameter of the front body portion 920 can be reduced to clamp the pipe fitting 105 around the corresponding piping component (e.g., the first piping component 310 (shown in FIG. 3) received in the fitting void 124.

FIGS. 10-14 illustrate the pipe cap fitting 105 in accordance with another aspect of the present disclosure. Similar to the pipe fittings 105 of FIG. 9, the pipe cap fitting 105 of the present aspect can comprise the fitting body 106 cast monolithically from a suitably flexible metal material, such as, for example, brass, and can further comprise a single one of the fastener assemblies 140. The monolithic casting of the fitting body 106 can comprise the front body portion 920 formed at the front end 118 and the rear body portion 922 formed at the rear end 119. An end cap 1010 can be coupled to the rear body portion 922 at the rear end 119. The end cap 1010 can be monolithically formed with the fitting body 106 or can be formed separately from the fitting body 106. The front body portion 920 can define the gap 924 between the first end 112 and the second end 114, and the central portion can extend circumferentially around the fitting body 106 from first end 112 to the second end 114. The front body portion 920 can generally define the substantially C-shaped upper front segment 926 and the substantially C-shaped lower front segment 928 opposite the upper front segment 926. The fitting void 124 can extend through the fitting body 106 from the front end 118 to the rear end 119. The gasket 180 and the grip ring 170 can be disposed within the fitting void 124.

Example aspects of the fitting body 106 can define one or more relief openings 1012 formed through the front body portion 920. In the present aspect, as least one relief opening 1012 is formed through each of the upper front segment 926 and the lower front segment 928. Additionally, the fitting body 106 can further define the circumferential upper slot 940 (shown in FIG. 14) extending partially about the upper front segment 926 at the joint between the front body portion 920 the rear body portion 922. The fitting body 106 can also define a circumferential lower slot 1110 (shown in FIG. 11) that can extend partially about the lower front segment 928 at the joint between the front body portion 920 and the rear body portion 922. In example aspects, the circumferential upper slot 940 can meet the circumferential lower slot 1110 adjacent to the first upper fastener lug 126 and the first lower fastener lug 130. The relief openings 1012, the circumferential upper and lower slots 940, 1110, and the flexibility of the brass material can permit the upper front segment 926 and the lower front segment 928 to flex towards one another as the corresponding fastener assembly is tightened.

According to example aspects, the first upper fastener lug 126 can be formed at the first end 112 of the front body portion 920, and the first lower fastener lug 130 can be formed at the second end 114 of the front body portion 920. The fastener assembly 140 can comprise the threaded fastener 146 and the threaded nut 148, and can be tightened in substantially the same manner as described above. As the fastener assembly 140 is tightened and the upper and lower front segments 926, 928 flex towards one another, the first end 112 can be drawn towards the second end 114 and the inner diameter of the front body portion 920 can be reduced to clamp the pipe cap fitting 105 around the first piping component 310 (shown in FIG. 13) received in the fitting void 124.

In example aspects, the pipe cap fitting 105 can further comprise a fastener alignment device 1014 mounted on the threaded tail 656 of the threaded fastener 146 between the first upper fastener lug 126 and the first lower fastener lug 130. The fastener alignment device 1014 can further grip the rear body portion 922, as described in further detail below. The fastener alignment device 1014 can maintain proper alignment of the threaded fastener 146 to aid in preventing twisting or other undesirable warping of the upper and lower front segments 926,928 under torque in the tightened configuration.

Figure 11:
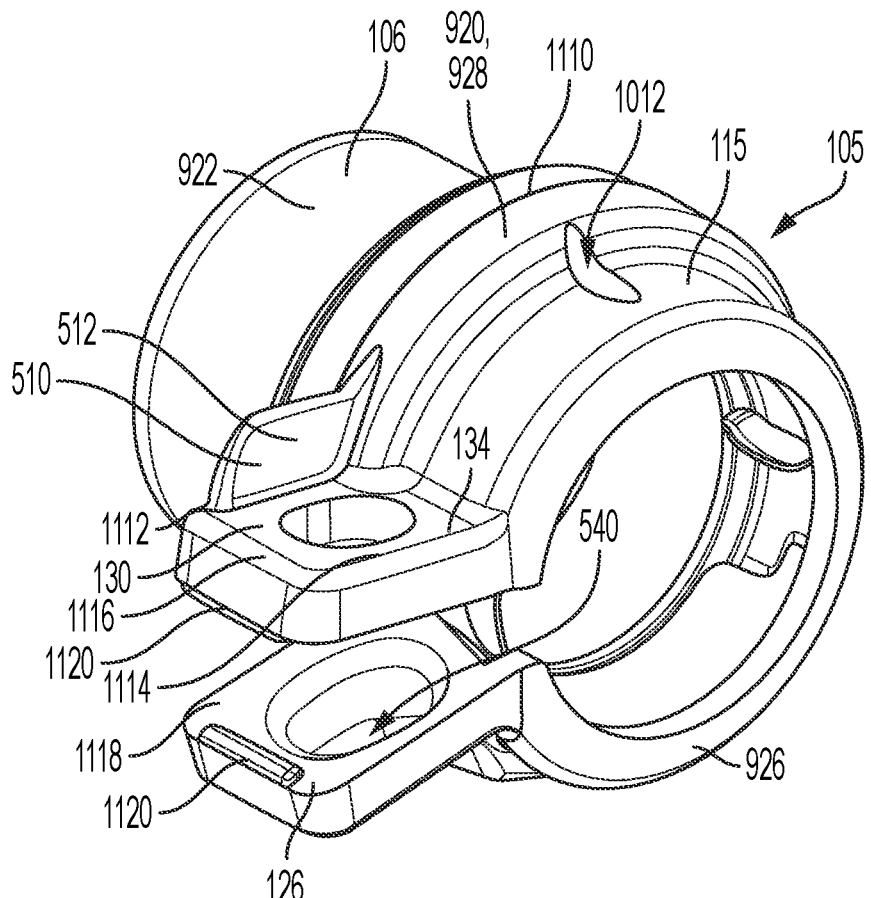
FIG. 11 is a bottom perspective view of the fitting body of FIG. 10.

FIG. 11 illustrates a bottom perspective view of the pipe cap fitting 105 with the fastener assembly 140 removed. In the present aspect, instead of the first locking projection 510 being formed proximate to the first lower fastener lug 130, the fitting body 106 can define the first locking projection 510 projecting from the central section 115 and extending along the outer lug surface 134 at a back end 1112 of the first lower fastener lug 130. In other aspects, the first locking projection 510 can be formed at a forward end 1114 or an outer end 1116 of the first lower fastener lug 130. The first locking projection 510 can define the substantially planar locking face 512, which can be oriented about perpendicular to the first lower fastener lug 130. The substantially planar locking face 512 can be configured to engage one of the planar side faces 612 (shown in FIG. 13) of the threaded nut 148 (shown in FIG. 13) to prohibit rotation of the threaded nut 148. Additionally, each of the first upper fastener lug 126 and the first lower fastener lug 130 can define an inner lug surface 1118 opposite the outer lug surface 134. The inner lug surfaces 1118 can substantially face one another, as shown. In example aspects, an alignment ridge 1120 can project from each of the inner lug surfaces 1118.

Figure 12:
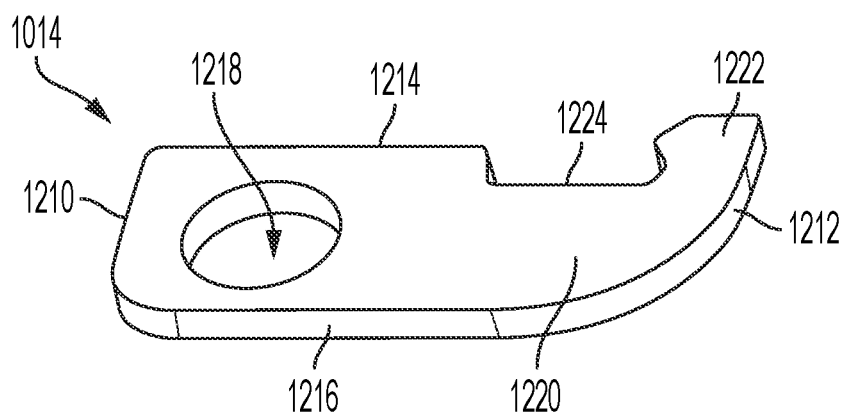
FIG. 12 is a top perspective view of a fastener alignment device of the compression fitting of FIG. 10.

FIG. 12 illustrates an example aspect of the fastener alignment device 1014. The fastener alignment device 1014 can define a first device end 1210 and a second device end 1212 opposite the first device end 1210. The fastener alignment device 1014 can further define an inner side 1214 and an outer side 1216. In example aspects, an alignment hole 1218 can be formed through the fastener alignment device 1014 proximate to the first device end 1210. The alignment hole 1218 can be configured to receive the threaded tail 656 (shown in FIG. 13) of the threaded fastener 146 (shown in FIG. 13) therethrough. The fastener alignment device 1014 can further define an alignment hook 1220 extending from the alignment hole 1218 to the second device end 1212. As shown, the alignment hook 1220 can arc inward towards the inner side 1214 at the second device end 1212. Moreover, an alignment notch 1224 can extend into inner side 1214 of the fastener alignment device 1014, adjacent to a hook end 1222 of the alignment hook 1220, as shown. In example aspects, the fastener alignment device 1014 can comprise a metal material, such as, for example stainless steel. In other aspects, the fastener alignment device 1014 can comprise any other suitable material, including but not limited to, other metals, plastics, composites, and the like.

Figure 13:
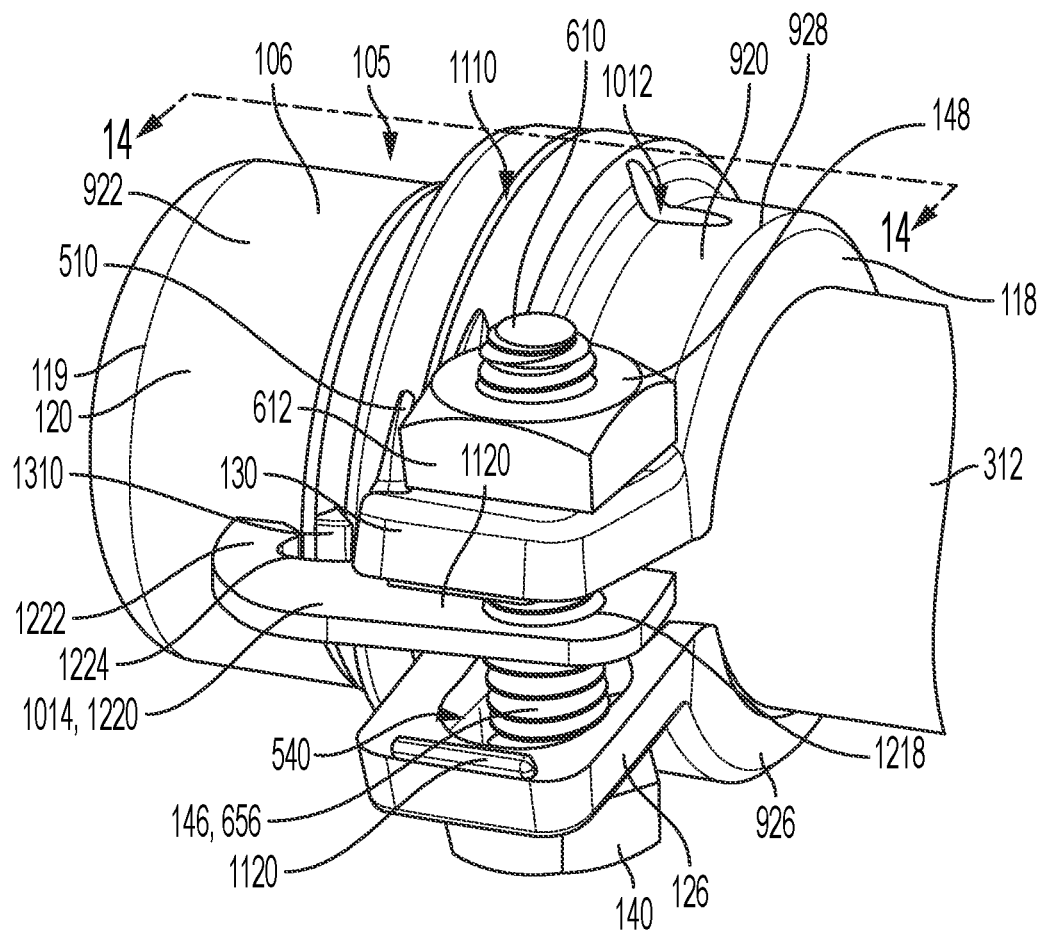
FIG. 13 is a bottom perspective view of the compression fitting of FIG. 10.

FIG. 13 illustrates a bottom perspective view of the pipe cap fitting 105 tightened onto the pipe segment 312 by the fastener assembly 140. As shown, the threaded tail 656 of the threaded fastener 146 can extend through the lug openings 540 of the first upper fastener lug 126 and the first lower fastener lug 130. The threaded nut 148 can be mounted to the distal end 610 of the threaded tail 656, and one of the planar side faces 612 of the threaded nut 148 can abut the planar locking face 512 (shown in FIG. 11) of the first locking projection 510 to prohibit rotation of the threaded nut 148. The threaded fastener 146 can be rotated to advance the threaded tail 656 further through the threaded opening 710 (shown in FIG. 7) of the threaded nut 148, tightening the fastener assembly 140 and bending the front body portion 920 of the fitting body 106 to clamp around the pipe segment 312. As described above, the relief openings 1012, the circumferential upper and lower slots 940, 1110 (circumferential upper slot 940 shown in FIG. 14), and the flexibility of the brass material can permit the upper front segment 926 and the lower front segment 928 to flex towards one another.

In some aspects, the deformation of the upper front segment 926 and/or the lower front segment 928 may not be uniform, which can cause the upper and/or lower front segments 926, 928 to twist and become warped. In particular, the area around the first upper fastener lug 126 and the first lower fastener lug 130, which are floating and unconnected to the rear body portion 922, can bend forward and/or can twist radially outward at the front end 118 of the fitting body 106. However, maintaining the position and proper alignment of the fastener assembly 140 can aid in preventing the front body portion 920 from warping.

According to example aspects, the alignment hole 1218 of the fastener alignment device 1014 can be disposed between the first upper fastener lug 126 and the first lower fastener lug 130, and the threaded tail 656 can extend through the alignment hole 1218. The alignment hook 1220 can extend towards the rear end 119 of the fitting body 106, and the hook end 1222 can arc radially inward towards the outer surface 120 of the fitting body 106. The rear body portion 922 of the fitting body 106 can define a hook engagement projection 1310 projecting outwardly from the outer surface 120. The hook engagement projection 1310 can extend into the alignment notch 1224 and the hook end 1222 of the alignment hook 1220 can catch on the hook engagement projection 1310 to prohibit axial movement of the fastener alignment device 1014, and thereby prohibit axial movement of the threaded fastener 146, towards the front end 118. The fastener alignment device 1014 can also abut the outer surface 120 of the fitting body 106 to prohibit radially inward movement of the fastener alignment device 1014, and thereby prevent radially inward movement of the threaded fastener 146.

Furthermore, in the tightened configuration, the alignment ridges 1120 of the first and second upper fastener lugs 126, 130 can confront one another, and in some instances may contact one another. The alignment ridges 1120 can prohibit movement of the fastener alignment device 1014, and thereby prohibit movement of the threaded fastener 146, in the radially outward direction. The fastener alignment device 1014 can thereby maintain the position and alignment of the fastener assembly 140 to limit or prevent the warping of the upper and lower front segments 926, 928.

Figure 14:
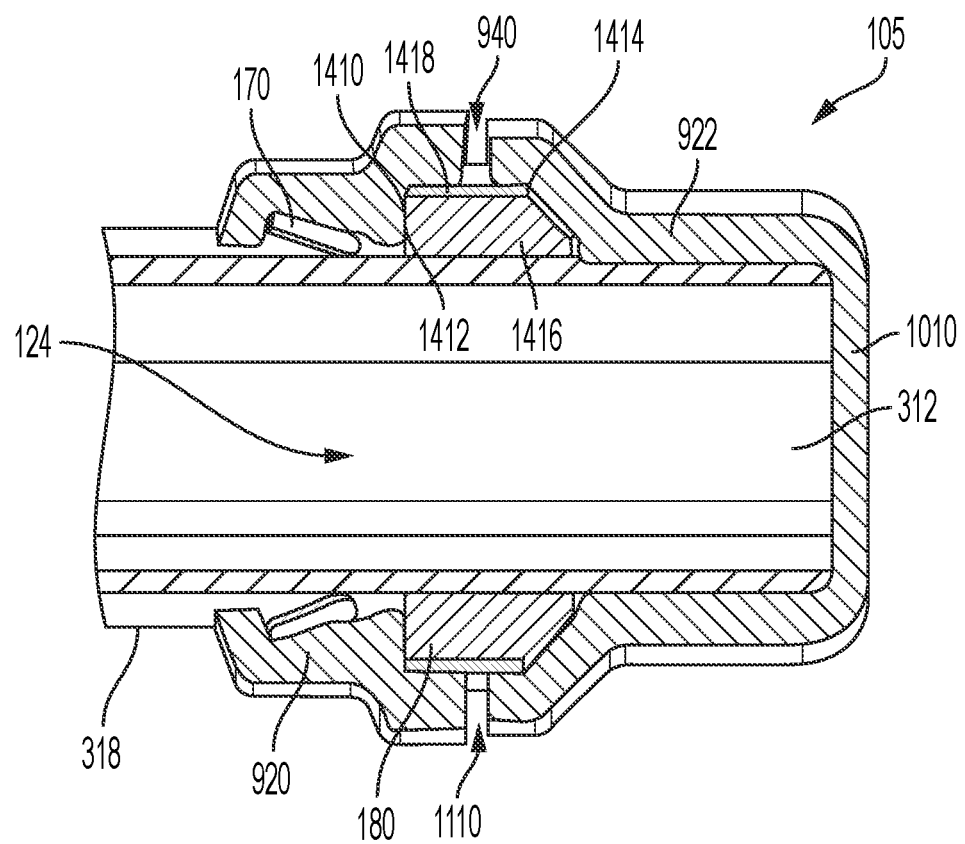
FIG. 14 is a cross-sectional view of the compression fitting of FIG. 10 taken along line 14-14 in FIG. 13.

FIG. 14 illustrates a cross-sectional view of the pipe cap fitting 105 taken along line 14-14 in FIG. 13. According to example aspects, the pipe segment 312 can extend through the fitting void 124 to abut the end cap 1010. As shown, the grip ring 170 can press into and the gasket 180 can seal with the outer piping surface 318 of the pipe segment 312 in the tightened configuration of the pipe fitting 100. In the present aspect, the gasket 180 can span each of the circumferential upper slot 940 and the circumferential lower slot 1110. A front gasket end 1410 of the gasket 180 can be positioned within a front gasket groove 1412 of the front body portion 920, and a rear gasket end 1414 of the gasket 180 can be positioned within a rear gasket groove 1416 of the rear body portion 922. In some aspects, a gasket ring 1418 can be disposed between the gasket 180 and the circumferential upper and lower slots 940, 1110 to prevent the gasket 180 from extruding through the circumferential upper and lower slots 940, 1110 when compressed in the tightened configuration. The gasket ring 1418 can comprise a flexible metal material in example aspects, such that the gasket ring 1418 can flex as the front body portion 920 is clamped around the pipe segment 312. In other aspects, the gasket ring 1418 can comprise any other suitably flexible material. Other aspects of the pipe cap fitting 105 may not comprise the gasket ring 1418, and the circumferential upper and lower slots 940, 1110 can be suitably narrow to prevent the gasket 180 from extruding therein.

Figure 15:
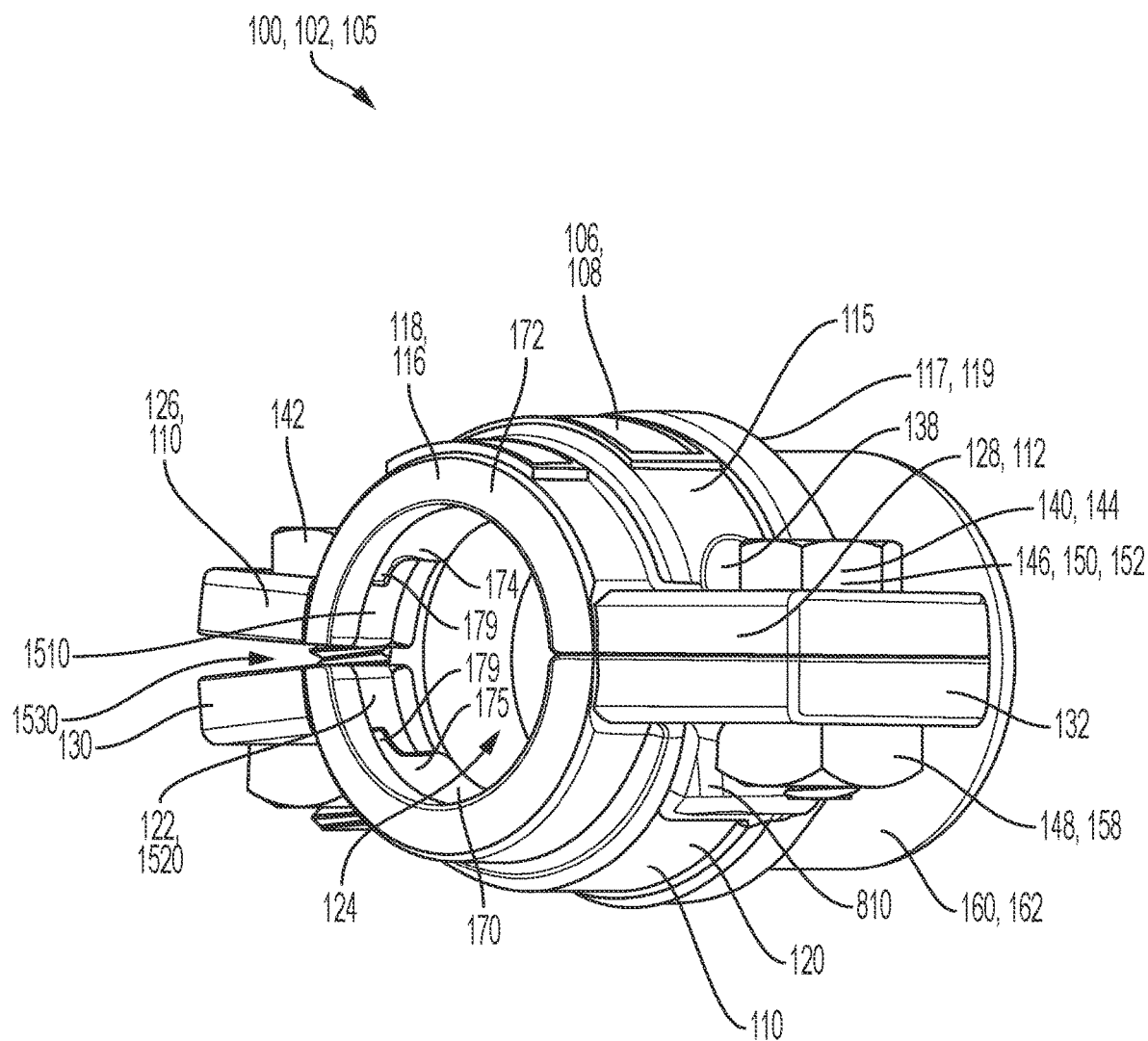
FIG. 15 is a perspective view of the compression fitting in accordance with another aspect of the present disclosure.

FIG. 15 illustrates the pipe fitting 100 according to another example aspect of the disclosure Similar to the pipe fitting 100 shown in FIGS. 1-8, the pipe fitting 100 of the present aspect can be the pipe cap fitting 105. In other aspects, the pipe fitting 100 can be any other suitable type of fitting known in the art, including but not limited to, an adapter, tee, elbow, flange, pipe coupling, and the like. The pipe fitting 100 can be configured to connect to one or more piping components, which can include pipe segments, any suitable fitting, valves, or the like. In the present aspect, one of the piping components can be the cap 162, which can be considered part of the pipe cap fitting 105.

Example aspects of the pipe cap fitting 105 can comprise the fitting body 106. The fitting body 106 can comprise the upper fitting segment 108 and the lower fitting segment 110. Each of the upper and lower fitting segments 108, 110 can be substantially C-shaped (e.g., substantially semi-circular). In other aspects, the pipe cap fitting 105 can comprise more or fewer fitting segments. Each of the upper and lower fitting segments 108, 110 can define the first end 112, the opposing second end 114, and the central section 115 extending therebetween. Additionally, each of the upper and lower fitting segments 108, 110 can define the front segment end 116 and the rear segment end 117. The front segment ends 116 can define the front end 118 of the pipe cap fitting 105, and the rear segment ends 117 can define the rear end 119 of the pipe cap fitting 105. Each of the upper and lower fitting segments 108, 110 can further define the outer surface 120 and the opposite inner surface 122. The fitting void 124 can be defined between the central sections 115 of the upper and lower fitting segments 108, 110. The cap 162 can engage the fitting void 124 at the rear end 119 of the pipe cap fitting 105.

As previously described, in example aspects, each of the upper and lower fitting segments 108, 110 can be cast monolithically from a suitable cast material, such as cast brass for example and without limitation. In other example aspects, the upper and/or lower fitting segments 108, 110 can be formed from another suitable material, or a combination of materials, that are known in the art, including but not limited to other metals, plastics, composites, and the like. Moreover, in other aspects, the upper and lower fitting segments 108, 110 may not be formed monolithically and/or can be formed by any other suitable manufacturing process.

The first upper fastener lug 126 can be formed at the first end 112 of the upper fitting segment 108, and the second upper fastener lug 128 can be formed at the second end 114 of the upper fitting segment 108. Each of the first and second upper fastener lugs 136, 128 can extend radially outward from the central section 115 of the upper fitting segment 108. The first lower fastener lug 130 can be formed at the first end 112 of the lower fitting segment 110, and the second lower fastener lug 132 can be formed at the second end 114 of the lower fitting segment 110. Each of the first and second lower fastener lugs 130, 132 can extend radially outward from the central section 115 of the lower fitting segment 110. The first fastener assembly 142 can extend through the lug openings 540 (shown in FIG. 16) of the first upper fastener lug 126 and the first lower fastener lug 130 to couple the upper fitting segment 108 to the lower fitting segment 110 at the first ends 112 thereof. The second fastener assembly 144 can extend through the lug openings 540 of the second upper fastener lug 128 and the second lower fastener lug 132 to couple the upper fitting segment 108 to the lower fitting segment 110 at the second ends 114 thereof.

Figure 21:
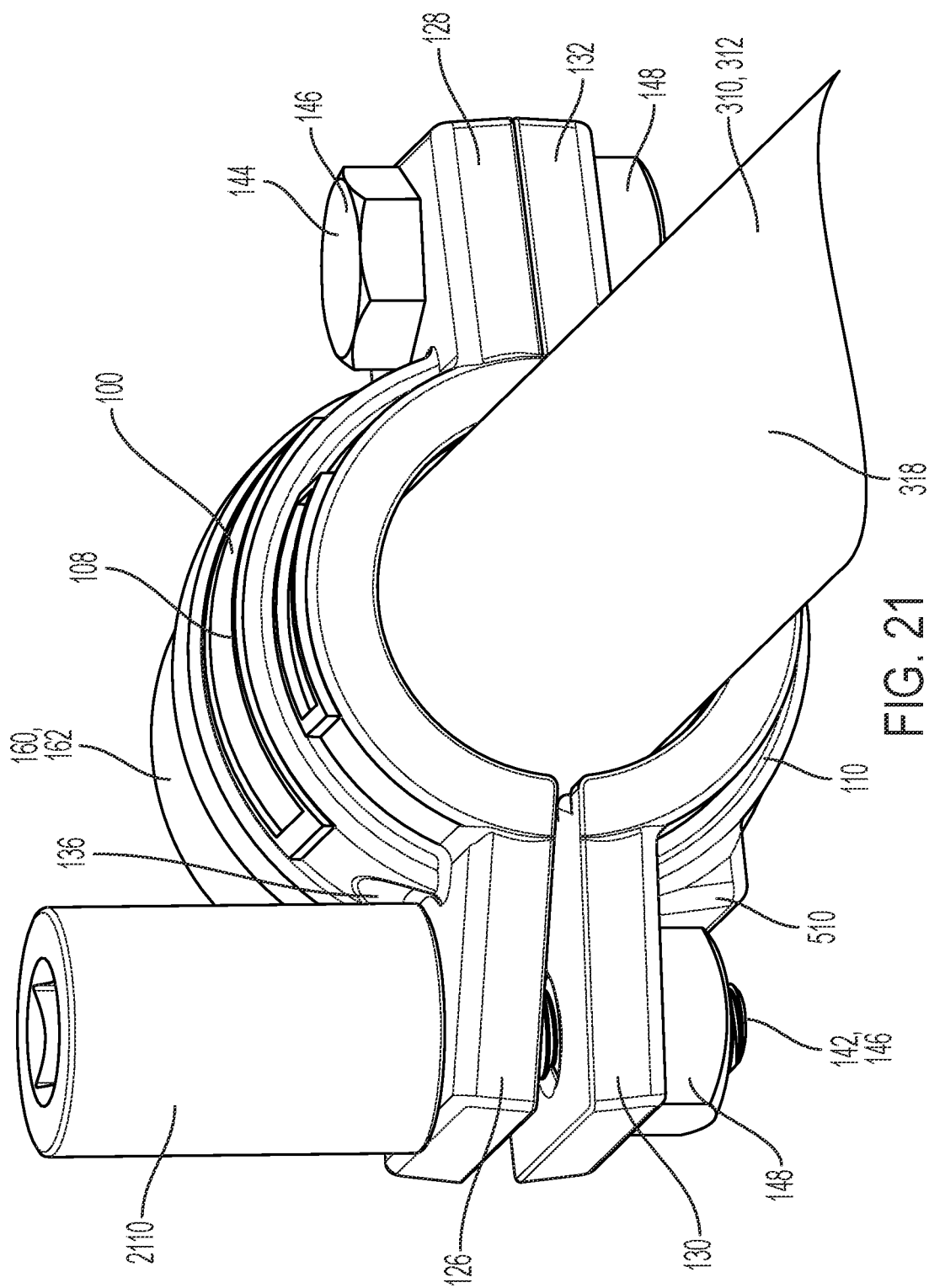
FIG. 21 is a perspective view of the compression fitting of FIG. 15 being tightened around a pipe.

The fastener assemblies 140 can be tightened as previously described to secure the upper and lower fitting segments 108, 110 to the cap 162 and the pipe segment 312 (shown in FIG. 21). In the present aspect, each of the first and second fastener assemblies 142, 144 can comprise one of the threaded fasteners 146 (for example, one of the hex head set screws 150) and one of the threaded nuts 148 (for example, one of the threaded square nut 158). In other aspects, however, either or both of the fastener assemblies 140 may not comprise the threaded nut 148, and the threaded fastener 146 can be configured to mate with internal threading defined within either or both the corresponding lug openings 540. For example, in some aspects, the lug openings 540 of the first and second lower fastener lugs 130, 132 can define the internal threading. Each of the threaded fasteners 146 can be received through the corresponding lug opening 540 of the first or second upper fastener lug 126, 128 and can further engage the threaded lug openings 540 of the corresponding first or second lower fastener lugs 130, 132. The threaded fasteners 146 can be rotated within the threaded lug openings 540 of the lower fitting segment 110 to tighten the corresponding fastener assembly 140. In other aspects, the first and/or second fastener assemblies 142, 144 can comprise any other suitable types of fastener or fastening technique.

In the present aspect, the threaded square nut 158 of each of the first and second fastener assemblies 142, 144 can be prohibited from rotation by engagement with the corresponding first or second locking projection 510, 810 (510 shown in FIG. 19) of the lower fitting segment 110, as previously described. Thus, to tighten each of the fastener assemblies 140, the hex head set screw 150 can be rotated relative to the threaded square nut 158. According to example aspects, the upper fitting segment 108 can define the first and second clearance recesses 136, 138 (136 shown in FIG. 16) formed in the central section 115, which can provide sufficient clearance for the corresponding hex head set screws 150 to rotate as the first and second fastener assemblies 142, 144 are tightened. The first and second clearance recesses 136, 138 can also provide a suitable clearance for the socket 2110 (shown in FIG. 21) or a ratchet of a tightening tool to engage the head portion 152 of each threaded fastener 146 during tightening.

In some aspects, the upper and lower fitting segments 108, 110 can be assembled together around a joint between the first and second piping components 310, 160 (e.g., the pipe segment 312 and the cap 162, respectively), and the first and second fastener assemblies 142, 144 can be tightened to clamp the pipe fitting 100 around the first and second piping components 310, 160. In some aspects, the upper and lower fitting segments 108, 110 can be pre-assembled with each of the first and second fastener assemblies 142, 144 in a loosened configuration, such that the fitting void 124 can be widened to allow the first and second piping components 310, 160 to be inserted therein as previously described. In some aspects, the upper and lower fitting segments 108, 110 can be assembled together around the first piping component 310, and the first and second fastener assemblies 142, 144 can then be just slightly tightened to the loosened configuration. With the pipe fitting 100 now in the pre-assembled configuration, the second piping component 160 can be inserted into the fitting void 124 and the fastener assemblies 140 can be tightened.

In the present aspect, as shown, the upper and lower fitting segments 108, 110 can be pre-assembled with one of the fasteners assemblies 140 (e.g., the first fastener assembly 142) in the loosened configuration and the other fastener assembly 140 (e.g., the second fastener assembly 144) in the tightened configuration. The first fastener assembly 142 being provided in the loosened configuration can allow the fitting void 124 to be widened to permit the first and second piping components 310, 160 to be inserted therein. In some aspects, one of the piping components (such as the cap 162 in the present aspect) may be assembled with the pipe fitting 100 prior to tightening the second fastener assembly 144, while the other piping component (such as the pipe segment 312) can be assembled with the pipe fitting 100 after the second fastener assembly 144 has been tightened. In some aspects, as shown, the threaded fastener 146 of the first fastener assembly 142 (i.e., the fastener assembly 140 provided in the loosened configuration) can be longer than the threaded fastener 146 of the second fastener assembly 144 (i.e., the fastener assembly 140 provided in the tightened configuration). The longer threaded fastener 146 of the first fastener assembly 142 can allow for a wider gap 1530 between the first ends 112 of the upper and lower fitting segments 108, 110 in the loosened configuration. In other aspects, the lengths of the threaded fasteners 146 can vary, and may be about equal in some aspects.

In example aspects, the pipe fitting 100 can further comprise the grip ring 170 and/or the annular gasket 180 (shown in FIG. 1) disposed within the fitting void 124. The grip ring 170 can be substantially arcuate in shape and can be formed as a split ring defining the first circumferential ring end 174 and the second circumferential ring end 175. The pipe fitting 100 can define the annular retaining lip 172 extending radially inward at the front end 118 thereof to prevent axial movement of the grip ring 170 towards the front end 118. As previously described, as the fastener assemblies 140 are tightened, the fitting segments 108, 110 can push the grip ring 170 radially inward. The grip ring 170 can flex or bend, allowing the first circumferential ring end 174 to move towards the second circumferential ring end 175 and reducing the diameter of the grip ring 170.

In previously described aspects, the T-shaped retention rib 178 (shown in FIG. 1) can be formed in either of the lower fitting segment 110 or the upper fitting segment 108, which can engage and serve as a stop for the first and second circumferential ring ends 174, 175. However, in the present aspect, the inner surface 122 of the upper fitting segment 108 can define a first retention rib 1510 projecting radially inward from the corresponding central section 115, and the inner surface 122 of the lower fitting segment 110 can define a second retention rib 1520 projection radially inward from the corresponding central section 115. The first retention rib 1510 of the upper fitting segment 108 can engage and serve as a stop for the first circumferential ring end 174, and the second retention rib 1520 of the lower fitting segment 110 can engage and serve as a stop for the second circumferential ring end 175. The first and second retention ribs 1510, 1520 can also prevent axial movement of the grip ring 170 towards the rear end 119 of the pipe fitting 100.

As shown, the first retention rib 1510 can be formed proximate to the first end 112 of the upper fitting segment 108, and the second retention rib 1520 can be formed proximate to the first end 112 of the lower fitting segment 110. Each of the first retention rib 1510 and the second retention rib 1520 can define one of the rib notches 179 for receiving the ring tab 171 at the corresponding first or second circumferential ring end 174, 175 of the grip ring 170. In this way, a split 2010 (shown in FIG. 20) defined between the first and second circumferential ring ends 174, 175 of the grip ring 170 can bridge the gap 1530 between the first ends 112 of the upper and lower fitting segments 108, 110 in the loosened configuration. As the first fastener assembly 142 is tightened and the first circumferential ring end 174 is biased towards the second circumferential ring end 175, the first retention rib 1510 and the second retention rib 1520 can also be drawn towards one another.

Figure 16:
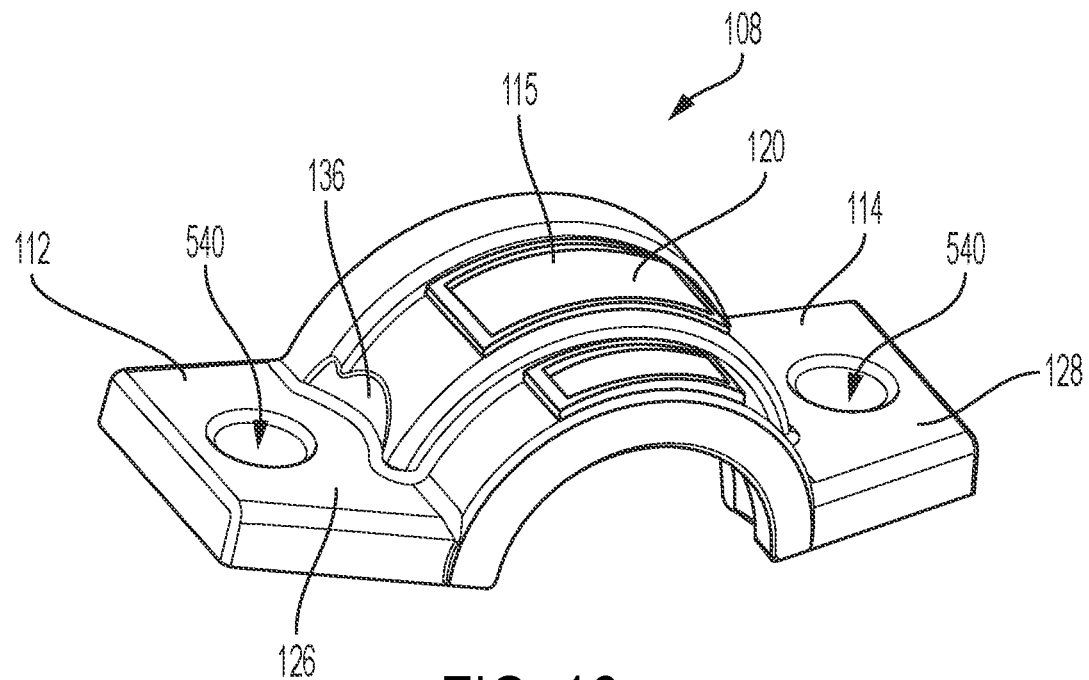
FIG. 16 is a top perspective view of a first fitting segment of the compression fitting of FIG. 15.
Figure 17:
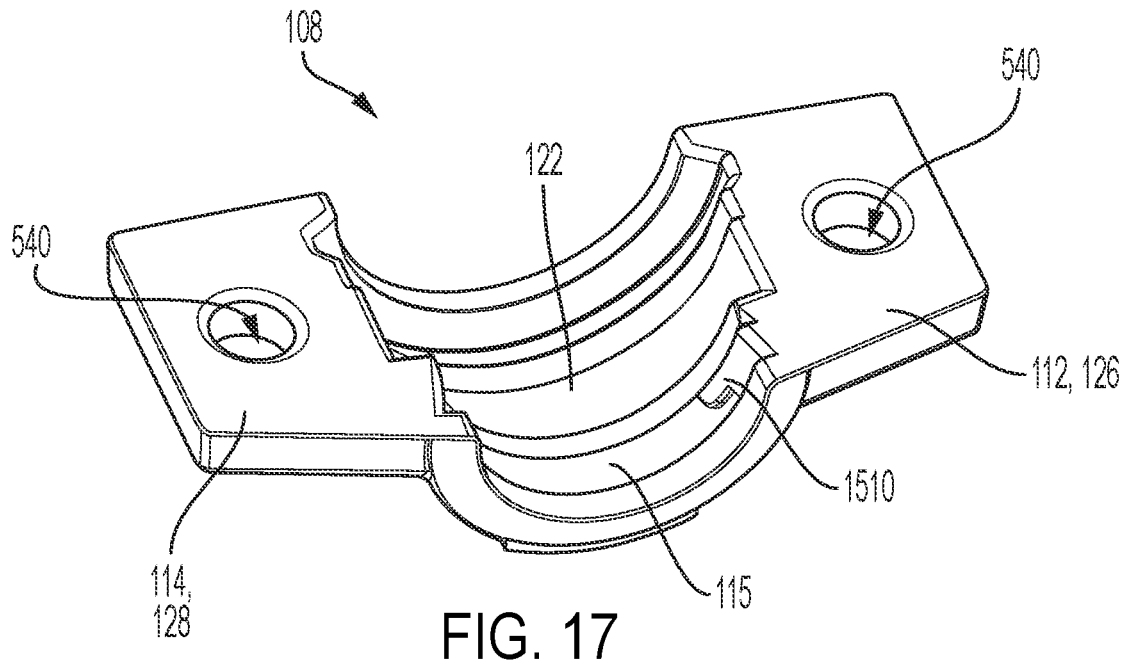
FIG. 17 is a bottom perspective view of the first fitting segment of FIG. 16.

FIG. 16 is a top perspective view of the upper fitting segment 108, and FIG. 17 is a bottom perspective view of the upper fitting segment 108. Referring to FIG. 16, the upper fitting segment 108 can comprise the first upper fastener lug 126 formed at the first end 112, the second upper fastener lug 128 formed at the second end 114, and the substantially arcuate central section 115 therebetween. The arcuate central section 115 can be substantially semi-circular and the first and second upper fastener lugs 126, 128 can extend radially outward therefrom. One of the lug openings 540 can be formed through each of the first and second upper fastener lugs 126, 128. The outer surface 120 of the upper fitting segment 108 can define the first and second clearance recesses 136, 138 (138 shown in FIG. 15) formed in the central section 115 adjacent to the first and second upper fastener lugs 126, 128, respectively.

Figure 18:
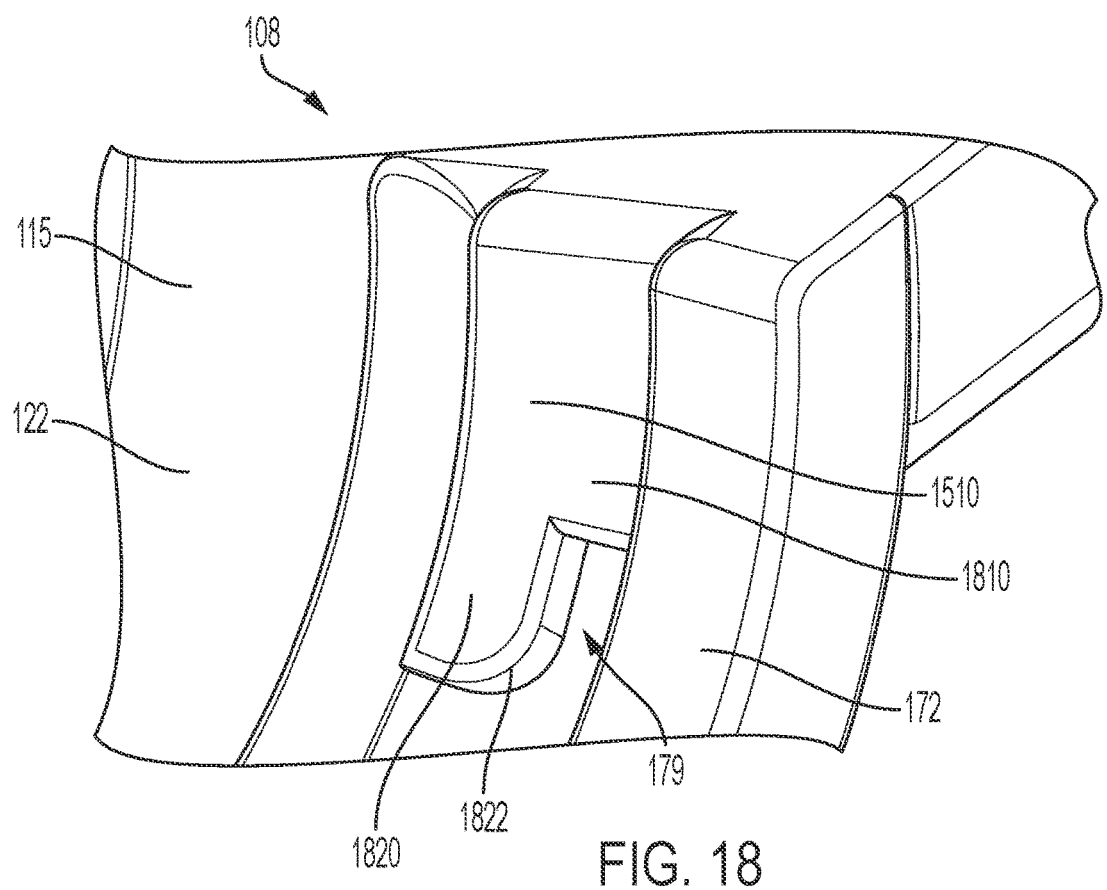
FIG. 18 is a detail view of the first fitting segment of FIG. 16.

Referring to FIG. 17, the inner surface 122 of the upper fitting segment 108 can define the first retention rib 1510 projecting radially inward from the central section 115. In the present aspect, the first retention rib 1510 can be formed proximate to the first end 112 of the upper fitting segment 108. The first retention rib 1510 can be substantially L-shaped in example aspects. FIG. 18 illustrates a detailed view of the L-shaped first retention rib 1510, which can also be illustrative of the second retention rib 1520 (shown in FIG. 15). According to example aspects, the L-shaped first retention rib 1510 can define a rib arm 1810 extending in a substantially axial direction from the annular retaining lip 172. The L-shaped first retention rib 1510 can further define a rib leg 1820 extending in a substantially circumferential direction from rib arm 1810, distal to the annular retaining lip 172. The rib notch 179 can be defined between the rib leg 1820, the rib arm 1810, and the annular retaining lip 172, as shown. In some aspects, an inner distal corner 1822 of the rib leg 1820 can be chamfered to facilitate guiding the corresponding ring tab 179 (shown in FIG. 15) into the rib notch 179.

Figure 19:
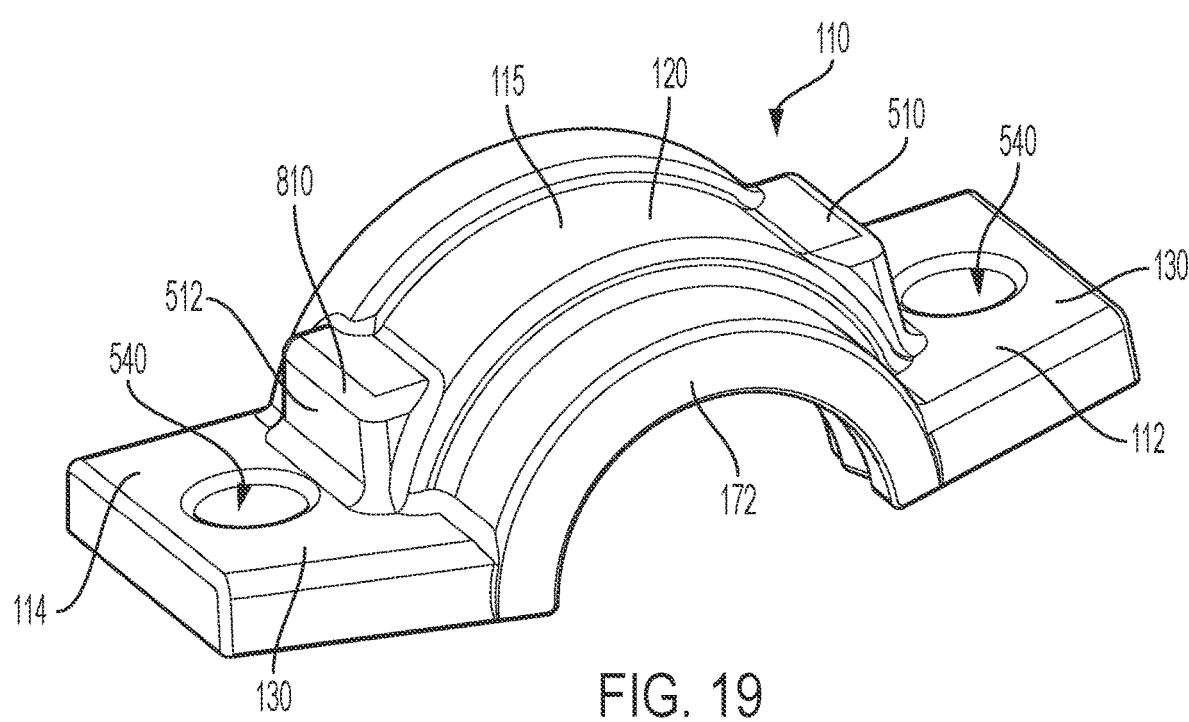
FIG. 19 is a bottom perspective view of a second fitting segment of the compression fitting of FIG. 15.

FIG. 19 is a bottom perspective view of the lower fitting segment 110. The lower fitting segment 110 can comprise the first lower fastener lug 130 formed at the first end 112, the second lower fastener lug 132 formed at the second end 114, and the substantially arcuate central section 115 therebetween. The arcuate central section 115 can be substantially semi-circular and the first and second lower fastener lugs 130, 132 can extend radially outward therefrom. One of the lug openings 540 can be formed through each of the first and second lower fastener lugs 130, 132.

The outer surface 120 of the lower fitting segment 110 can define the first and second locking projections 510, 810 formed in the central section 115 adjacent to the first and second lower fastener lugs 130, 132, respectively. In example aspects, each of the first and second locking projections 510, 810 can define the substantially planar locking face 512, which can engage the corresponding threaded nut 148 (shown in FIG. 15) to prohibit rotation thereof. However, as previously described, other example aspects of the pipe fitting 100 (shown in FIG. 15) may not comprise the threaded nuts 148, and furthermore, may not comprise the first and second locking projections 510, 810 in some aspects. In such aspects, the lug openings 540 of the lower fitting segment 110 can define the internal threading configured to mate with the corresponding threaded fastener 146 (shown in FIG. 15).

Figure 20:
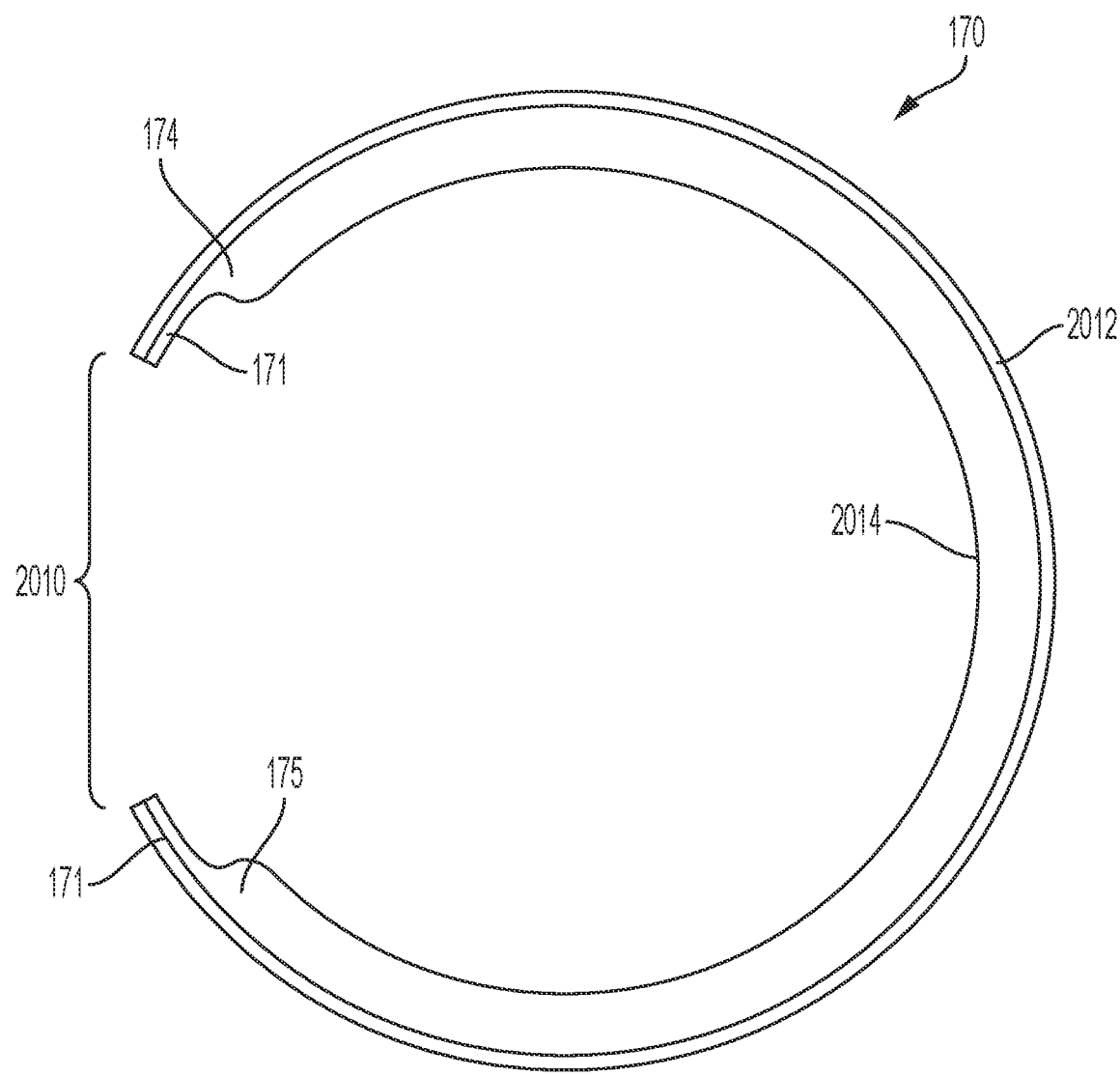
FIG. 20 is an end view of a grip ring of the compression fitting of FIG. 15.

FIG. 20 illustrates an example aspect of the grip ring 170. The grip ring 170 can be formed as a substantially arcuate split ring defining the split 2010 between the first circumferential ring end 174 and the second circumferential ring end 175. The grip ring 170 can comprise a flexible and/or bendable material, such as stainless steel for example and without limitation. Other aspects of the grip ring 170 can comprise any other suitable material, including but not limited to other metal materials, plastics, composites, or any other material known in the art having suitable strength for gripping pipes and tubing of varying materials.

As shown, the grip ring 170 can define the opposing ring tabs 171, wherein a first one of the ring tabs 171 can project from the first circumferential ring end 174 and an opposite second one of the ring tabs 171 can project from the second circumferential ring end 175. The grip ring 170 can further define first axial ring end 2012 and a second axial ring end 2014 opposite the first axial ring end 2012. In some aspects, a diameter of the grip ring 170 can taper from the first axial ring end 2012 to the second axial ring end 2014. Additionally, in some aspects, each of the ring tabs 171 can be defined at the first axial ring end 2012. In other aspects, the diameter of the grip ring 170 may not taper as illustrated and/or the ring tabs 171 may not be formed at the first axial ring end 2012.

FIG. 21 illustrates the pipe fitting 100 assembled with both the first piping component 310 (e.g., the pipe segment 312) and the second piping component 160 (e.g., the cap 162). In some aspects, the cap 162 can be pre-assembled with the pipe fitting 100, as shown in FIG. 15. Additionally, as previously described, example aspects of the pipe fitting 100 can be provided with the first fastener assembly 142 in the loosened configuration and the second fastener assembly 144 in the tightened configuration. The first fastener assembly 142 being provided in the loosened configuration can allow the fitting void 124 (shown in FIG. 15) to be widened to allow the pipe segment 312 to be inserted therein.

The first fastener assembly 142 can then be tightened, such as with the socket 2110 of a power tool (or any other suitable tightening tool), to clamp the upper and lower fitting segments 108, 110 around the pipe segment 312 and the cap 162. The first clearance recesses 136 can provide a suitable clearance for the socket 2110 to engage and rotate the threaded fastener 146 of the first fastener assembly 142, and the first locking projection 510 can engage the threaded nut 148 of the first fastening assembly 142 to prohibit rotation of the threaded nut 148. Moreover, as the first fastener assembly 142 is tightened, the grip ring 170 (shown in FIG. 15) can press or bite into the outer piping surface 318 of the pipe segment 312.

Figure 22:
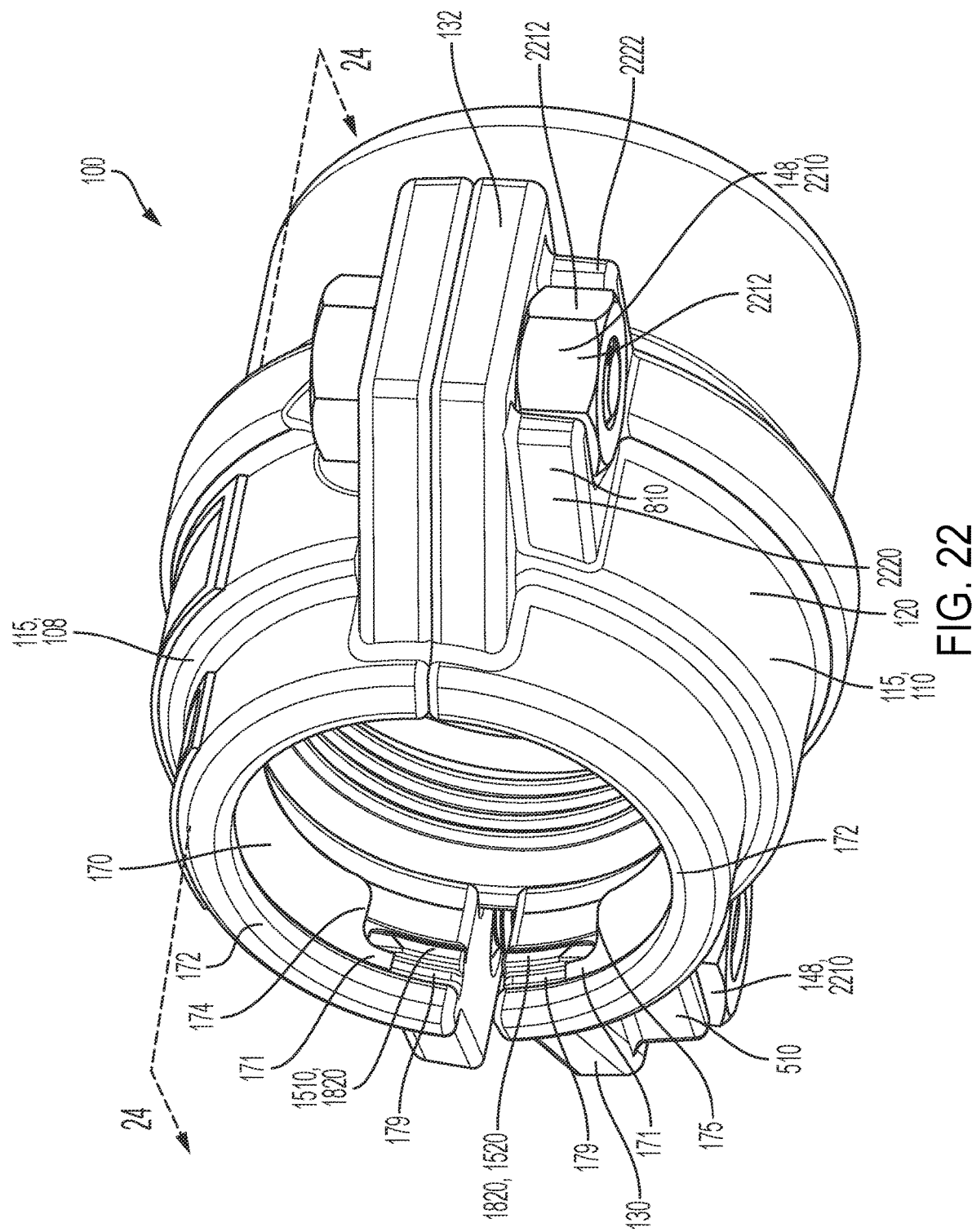
FIG. 22 is a bottom perspective view of the compression fitting in accordance with another aspect of the present disclosure.

FIG. 22 illustrates the pipe fitting 100 in accordance with another example aspect of the disclosure. The pipe fitting 100 of the present aspect can be similar to the pipe fitting 100 of FIGS. 15-21, with a few differences. First, in the present aspect, the first and second retention ribs 1510, 1520 of the upper and lower fitting segments 108, 110 do not define the L-shape previously described. As shown, each of the first and second retention ribs 1510, 1520 can define the rib leg 1820 only. The rib leg 1820 can project radially inward from the corresponding central section 115 and can extend in a substantially circumferential direction, parallel to the annular retaining lip 172. Each rib notch 179 can be defined between the corresponding rib leg 1820 and the retaining lip 172. The ring tab 171 extending from the first circumferential ring end 174 of the grip ring 170 can engage the rib notch 179 of the upper fitting segment 108, and the ring tab 171 extending from the second circumferential ring end 175 of the grip ring 170 can engage the rib notch 179 of the lower fitting segment 110.

Additionally, in the present aspect, the threaded nuts 148 can be threaded hex nuts 2210 instead of the threaded square nuts 158 (shown in FIG. 1) previously described. Each threaded hex nut 2210 can define six side faces 2212. The outer surface 120 of the lower fitting segment 110 can define the first and second locking projections 510, 810. In the present aspect, each of the first and second locking projections 510, 810 can comprise a first projection arm 2220 and a second projection arm 2222 axially aligned with the first projection arm 2220. Each of the first and second projection arms 2220, 2222 can extend radially outward from the central section 115 proximate to the corresponding first or second lower fastener lug 130, 132. Each of the threaded hex nuts 2210 can be disposed between the first and second projection arms 2220, 2222 of the corresponding first or second locking projection 510, 810, and the first and second projection arms 2220, 2222 can engage an opposing pair of the six side faces 2212 to prohibit rotation of the threaded hex nut 2210. In some aspects, the first and second locking projections 510, 810 can further engage additional faces of the six side faces 2212. Additionally, in some aspects, each of the first and second projection arms 2220, 2222 can also or alternatively extend substantially downward from the corresponding first or second lower fastener lug 130, 132.

Figure 23:
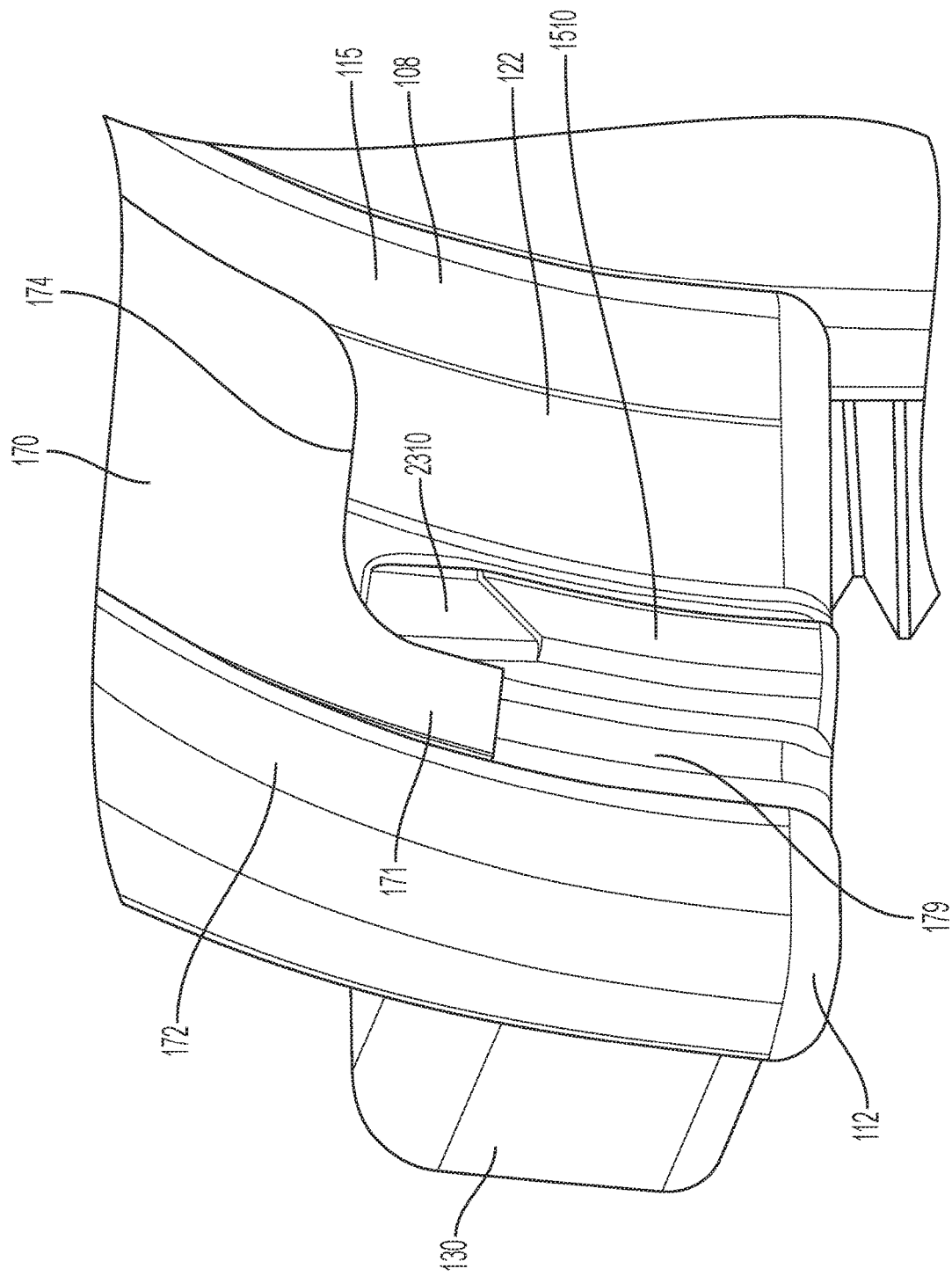
FIG. 23 is a detail view of a retention rib of the compression fitting of FIG. 22.

Referring now to FIG. 23, a detailed view of the first retention rib 1510 is shown, which can also be illustrative of the second retention rib 1520 (shown in FIG. 22). As shown, the first retention rib 1510 can be formed at or proximate to the first end 112 of the upper fitting segment 108. The inner surface 122 of the upper fitting segment 108 can define the first retention rib 1510 extending radially inward from the central section 115, substantially parallel to the retaining lip 172. The rib notch 179 can be defined between the corresponding first retention rib 1510 and the retaining lip 172. The ring tab 171 extending from the first circumferential ring end 174 of the grip ring 170 can engage of the rib notch 179, as shown. In some aspects, a proximal rib end 2310 of the first retention rib 1510 can be sloped or chamfered, as shown, to allow the first circumferential ring end 174 of the grip ring 170 to slide thereon as the grip ring 170 is compressed/bent radially inward.

Figure 24:
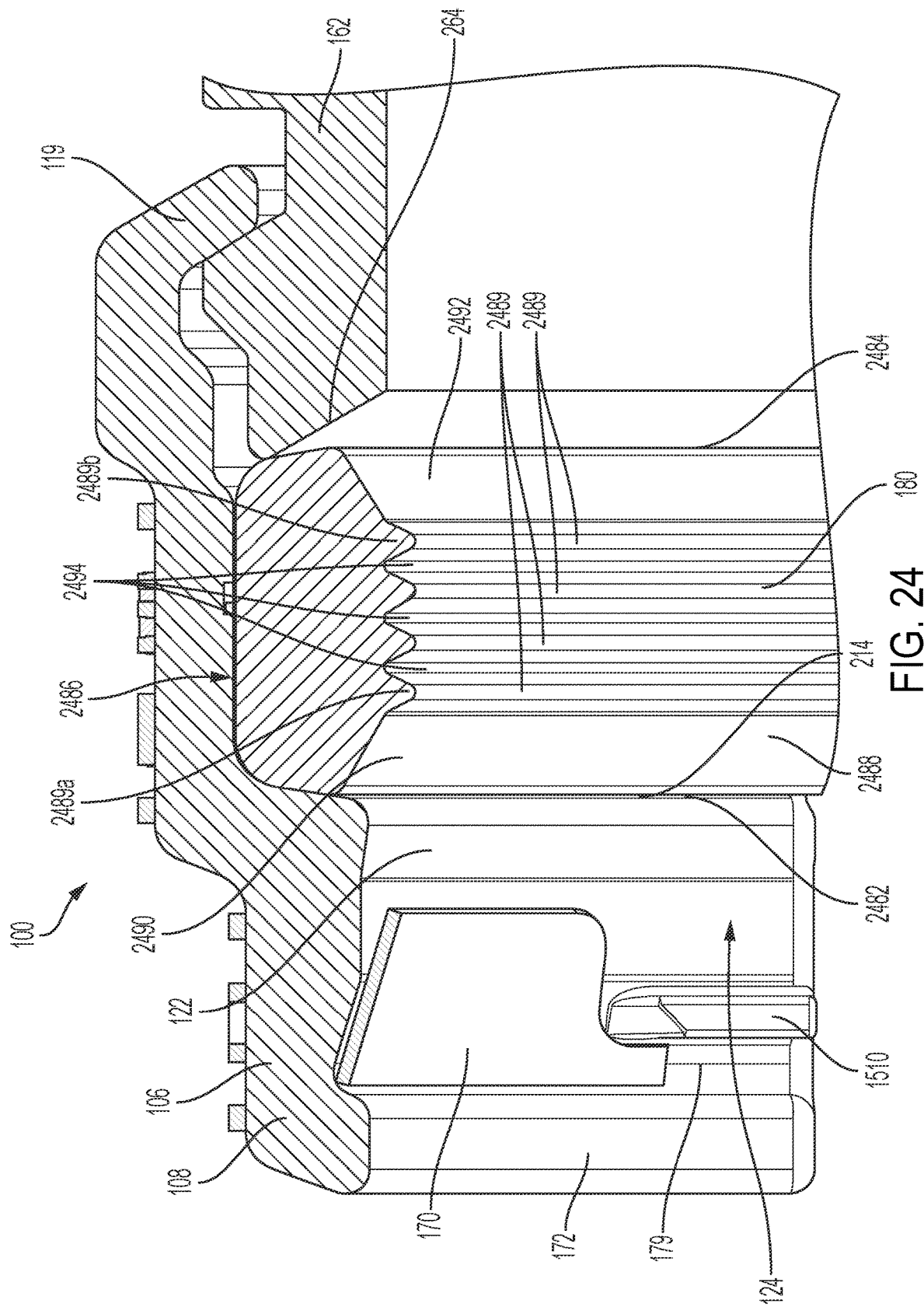
FIG. 24 is a cross-sectional view of the compression fitting of FIG. 22 taken along line 24-24 in FIG. 22.

Referring now to FIG. 24, the gasket 180 of the present aspect can be similar to or substantially the same as the gasket 180 disclosed in U.S. patent application Ser. No. 17/110,827, which is incorporated by reference above. Example aspects of the gasket 180 can comprise a resilient, flexible material, such as a rubber material for example, that can engage the outer piping surface 318 (shown in FIG. 3) of the first piping component 310 (shown in FIG. 3) to create a fluid-tight seal therewith. In other aspects, the gasket 180 can comprise any other suitable flexible and resilient material known in the art, including but not limited to polyurethane, TPU (thermoplastic polyurethane), TPE (thermoplastic elastomer), nylon, polypropylene, PVA (polyvinyl alcohol), sealants such as anaerobic sealants, glues, membranes, and resins, various types of rubbers, and the like.

According to example aspects, the gasket 180 can generally define a gasket first axial end 2482, a gasket second axial end 2484 opposite the gasket first axial end 2482, a gasket outer surface 2486, and a gasket inner surface 2488 opposite the gasket outer surface 2486. The gasket 180 can be disposed within the fitting void 124 axially between the grip ring 170 and the axially rear end 119 of the pipe fitting 100. More specifically, the gasket 180 can be compressed between the gasket shoulder 214 of the fitting body 106 and the cap end portion 264 of the cap 162. The gasket first axial end 2482 can abut the gasket shoulder 214, and the gasket second axial end 2484 can abut the cap end portion 264. The gasket shoulder 214 can be substantially annular in the present aspect, though other aspects of the shoulder 214 may not be substantially annular.

The gasket outer surface 2486 can engage the inner surfaces 122 of the upper and lower fitting segments 108, 110 (lower fitting segment 110 shown in FIG. 22). The gasket inner surface 2488 can comprise one or more annular flanges 2489 or annular ribs extending substantially inward, and the annular flanges 2489 can be configured to engage the outer piping surface 318. In example aspects, the annular flanges 2489 can define a substantially triangular cross-section, as illustrated, or can define any other suitable cross-section shape known in the art. In other aspects, the flanges 2489 may not be annular and may instead define an arcuate shape.

In the present aspect, the gasket inner surface 2488 can also define a first inner surface pocket 2490 between a first one of the annular flanges 2489a and the gasket first axial end 2482, i.e., the gasket 180 can taper from the first flange 2489a to the gasket first axial end 2482. In the present aspect, the first inner surface pocket 2490 can be defined as a chamfer. In other aspects, the shape of the first inner surface pocket 2490 can vary. In example aspects, the first inner surface pocket 2490 can aid in preventing the first piping component 310 from catching on the gasket inner surface 2488 proximate to the gasket first axial end 2482 and pulling the gasket 180 inward as the first piping component 310 is inserted into the fitting void 124. In some aspects, the gasket inner surface 2488 can further define a second inner surface pocket 2492 between a last one of the annular flanges 2489b and the gasket second axial end 2484, and the second inner surface pocket 2492 can aid in preventing the first piping component 310 from catching on the gasket inner surface 2488 proximate to the gasket second axial end 2484 as the first piping component 310 is withdrawn through the fitting void 124.

When the first piping component 310 is received within the fitting void 124, air pockets can be formed between each of the first and second inner surface pockets 2490, 2492 and the outer piping surface 318 (shown in FIG. 3), and also within grooves 2494 defined between the annular flanges 2489. The air pockets can provide the gasket 180 with a higher squish range, which can allow the pipe fitting 100 to be manufactured to a wider tolerance band.

One should note that the different aspects disclosed herein can be combined such that the pipe fitting 100 can include the features of more than one aspect. One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A compression fitting for engaging a piping component, the compression fitting configurable in a loosened configuration and a tightened configuration and comprising:
   a fitting body having a front end defining a front body portion and a rear end defining a rear body portion, the front body portion defining a first end, a second end, and a gap defined between the first end and the second end in the loosened configuration;
   a fastener assembly mounted to the fitting body and configured to tighten the compression fitting from the loosened configuration to the tightened configuration; and
   a fastener alignment device having a first device end and a second device end, the first device end defining an alignment hole that receives a portion of the fastener assembly therein, the first device end being disposed between the first end and the second end of the fitting body;
   wherein, in the tightened configuration, the first end of the fitting body contacts and stops against the second end of the fitting body, and wherein contact between the first end and the second end in the tightened configuration indicates to a user that the fastener assembly is tightened to a required torque for the compression fitting to properly engage the piping component, and wherein the fitting body defines a locking projection, the fastener assembly comprises a threaded nut and a threaded fastener rotationally engaging the threaded nut, and the locking projection contacts the threaded nut to prohibit rotation of the threaded nut.

2. The compression fitting of claim 1, wherein:
   the fitting body defines a fastener lug and a clearance recess adjacent to the fastener lug; and
   a fastener of the fastener assembly extends through the fastener lug;
   the fastener defines a head portion that is disposed proximate to the clearance recess; and
   the clearance recess is configured to provide suitable clearance for a socket of a tightening tool to engage the head portion.

3. The compression fitting of claim 1, wherein the fitting body is a monolithic casting.

4. The compression fitting of claim 1, wherein the compression fitting further comprises a grip ring disposed within a fitting void of the fitting body, wherein the grip ring is formed as a split ring and defines an engagement edge, the engagement edge configured to press into an outer surface of the piping component in the tightened configuration.

5. The compression fitting of claim 1, wherein the fastener assembly comprises a threaded nut and a threaded fastener engaging the threaded nut, and the threaded fastener is rotatably received in the alignment hole of the fastener alignment assembly.

6. The compression fitting of claim 1, wherein the second device end of the fastener alignment device is configured to engage a portion of the rear body portion of the fitting body.

7. The compression fitting of claim 6, wherein:
   the second device end of the fastener alignment device defines an alignment notch;
   the rear body portion of the fitting body defines a hook engagement projection; and
   the hook engagement projection is received within the alignment notch.

8. A method of tightening a compression fitting comprising:
   obtaining a compression fitting comprising a fitting body comprising a front end defining a front body portion and a rear end defining a rear body portion, the front body portion comprising a first end and a second end, a gap defined between the first end and the second end, and a fastener alignment device having a first device end and a second device end, the first device end being disposed in the gap between the first end and the second end;
   disposing at least a portion of a piping component within a fitting void of the compression fitting in a loosened configuration of the compression fitting, wherein the gap is defined between the first end and the second end in the loosened configuration;
   positioning a fastener assembly through the first end of the compression fitting, an alignment hole defined by the first device end of the fastener alignment device, and the second end of the compression fitting;
   tightening the fastener assembly to draw the first end of the compression fitting towards the second end of the compression fitting; and
   contacting the first end of the compression fitting with the second end of the compression fitting in a tightened configuration of the compression fitting, and wherein contact between the first end and the second end in the tightened configuration indicates to a user that the fastener assembly is tightened to a required torque for the compression fitting to properly engage the piping component,
   wherein the second device end of the fastener alignment device is configured to engage a portion of the rear body portion of the fitting body.

9. The method of claim 8, wherein tightening the fastener assembly to draw the first end of the compression fitting towards the second end of the compression fitting comprises engaging and rotating a threaded fastener of the fastener assembly with a tightening tool, and wherein the compression fitting defines a clearance recess providing suitable clearance for the tightening tool to engage and rotate the threaded fastener.

10. A compression fitting for engaging a piping component, the compression fitting configurable in a loosened configuration and a tightened configuration and comprising:
   a fitting body having a front end defining a front body portion and a rear end defining a rear body portion, the front body portion defining a first end, a second end, and a gap defined between the first end and the second end in the loosened configuration;
   a fastener assembly mounted to the fitting body and configured to tighten the compression fitting from the loosened configuration to the tightened configuration; and
   a fastener alignment device having a first device end and a second device end, the first device end defining an alignment hole that receives a portion of the fastener assembly therein, the first device end being disposed between the first end and the second end of the fitting body;
   wherein, in the tightened configuration, the first end of the fitting body contacts and stops against the second end of the fitting body, and wherein contact between the first end and the second end in the tightened configuration indicates to a user that the fastener assembly is tightened to a required torque for the compression fitting to properly engage the piping component, and wherein the second device end of the fastener alignment device is configured to engage a portion of the rear body portion of the fitting body.

* * * * *